(12) United States Patent
Shinjo et al.

(10) Patent No.: US 6,630,821 B2
(45) Date of Patent: Oct. 7, 2003

(54) MAGNETIC DETECTION DEVICE FOR DETECTING MOVING DIRECTION OF A TOOTHED MAGNETIC MOVABLE BODY

(75) Inventors: Izuru Shinjo, Tokyo (JP); Hiroshi Sakanoue, Tokyo (JP); Naoki Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 289 days.

(21) Appl. No.: 09/801,190

(22) Filed: Mar. 8, 2001

(65) Prior Publication Data
US 2002/0030487 A1 Mar. 14, 2002

(30) Foreign Application Priority Data

Sep. 14, 2000 (JP) .................... P 2000-280613

(51) Int. Cl.[7] .............. G01P 3/488; G01B 7/30
(52) U.S. Cl. ............. 324/207.21; 324/165; 324/207.25
(58) Field of Search ................. 324/207.21, 207.24, 324/165, 207.25; 340/672

(56) References Cited

U.S. PATENT DOCUMENTS 6,104,186 A    8/2000  Yamada et al.
6,282,954 B1   9/2001  Ott et al.
6,320,374 B1 * 11/2001 Schroeder et al. ..... 324/207.25

FOREIGN PATENT DOCUMENTS

| DE | 196 18 867 A1 | 2/1997 |
| DE | 198 16 686 A1 | 10/1998 |
| DE | 199 06 937 A1 | 9/2000 |
| JP | 3-246401 A | 11/1991 |
| JP | 11-51697 A | 2/1999 |
| JP | 2974349 | 9/1999 |
| JP | 2980215 | 9/1999 |

* cited by examiner

*Primary Examiner*—Walter E. Snow
(74) *Attorney, Agent, or Firm*—Sughrue Mion, PLLC

(57) ABSTRACT

A magnetic detection device capable of detecting moving direction of a toothed magnetic movement body is provided.

The magnetic detection device comprises a circuit for converting output signals of plural magneto-resistance effect elements 21 and 22 located in moving direction of toothed magnetic movable body to a ternary signal of a high level, a low level 1 and a low level 2, and in which a binary signal of the high level and the low level 1 is output when the toothed magnetic movement body is rotated in forward direction and a binary signal of the high level and the low level 2 is output when the toothed magnetic movement body is rotated in reverse direction.

13 Claims, 24 Drawing Sheets (a)

(b)

(c)

(a)

(b)

(c)

(a)

(b)

(c)

(a) At the rotation in forward direction (b) At the rotation in reverse direction (a) At the rotation in forward direction (b) At the rotation in reverse direction (a)

(b)

(c)

Signal form remains unchanged whether rotation is in forward direction or in reverse direction

MAGNETIC DETECTION DEVICE FOR DETECTING MOVING DIRECTION OF A TOOTHED MAGNETIC MOVABLE BODY

BACKGROUND OF THE INVENTION

1. Technical Field

The present invention relates to a magnetic detection device for detecting moving direction of a toothed magnetic movable body.

2. Background Art

FIG. 22 shows schematic views of a conventional magnetic detection device according to a prior art, and in which (a) is a front view, (b) is a perspective view and (c) is a partial top view. FIG. 23 is an electric circuit diagram of the conventional magnetic detection device. FIG. 24 is a waveform diagram of the electric circuit diagram shown in FIG. 23. The magnetic detection device is comprised of a rectangular parallelepiped magnet 1 for generating a magnetic field, and an IC chip 2 mounted on the upper surface of the magnet 1 and forming integrally a magneto-resistance effect element 6 serving as a magnetic detection element. Arrow 3 indicates a magnetized direction of the magnet 1. The magnetic detection device is located facing to and bringing close to a toothed magnetic rotor 4. Concave and convex parts of the toothed magnetic rotor 4 comes near alternately the magneto-resistance effect element 6 in the magnetic detection device when the toothed magnetic rotor 4 is rotated. Numeral 5 indicates the rotation axis of the toothed magnetic rotor 4. As a result, a magnetic field applied from the magnet 1 to the magneto-resistance effect element 6 is changed. The change in magnetic field is converted to a change in resistance of the magneto-resistance effect element 6, which is detected in the form of a change in voltage. The change in voltage is output to outside in the form of a pulse wave electric signal of through a comparator in the IC chip and an output transistor. The pulse wave electric signal is transmitted to a computer unit for counting number of pulse waves and detects rotation angle of the toothed magnetic rotor 4.

Generally, the magneto-resistance effect element 6 (hereinafter referred to as MR element) or a giant magneto-resistance effect element (hereinafter referred to as GMR element) is used as the magnetic detection element. The MR element is composed of a thin-film ferromagnetic material (such as Ni—Fe, Ni—Co, or the like), whose resistance value varies or changes depending on an angle formed between the direction of magnetization and the direction of electric current. The resistance value of the MR element is minimized when the direction of electric current and the direction of magnetization cross at right angles therebetween, and is maximized at 0 degree, i.e., when the mentioned two directions become exactly the same otherwise exactly opposite. The change in resistance value is hereinafter referred to as MR change ratio, which is generally 2 to 3% in Ni—Fe and 5 to 6% in Ni—Co.

The GMR element is a layered body formed by alternately laminating a magnetic layer and a nonmagnetic layer each being in the range from a few angstrom to a few dozen angstrom in thickness. The GMR element is a so-called super lattice film typically composed of (Fe/Cr), (Permalloy/Cu/Co/Cu) and (Co/Cu). The GMR element performs a MR effect (MR change ratio) remarkably superior to that of the MR element. Furthermore, The GMR element is an in-plane magnetic sensing element for providing the same degree of change in resistance value at all times irrespective of difference in angle between external magnetic field and electric current.

Operation of the GMR element and that of the MR element is substantially the same. Therefore, operation of the MR element is representatively described hereinafter in detail. In FIG. 23, bias magnetic field applied to the MR element 6 is changed by the rotation of the toothed magnetic rotor 4, and resistance value thereof is also changed. In order to detect a change in magnetic field, a bridge circuit 7 is formed using the MR element 6, and a power supply VCC preferably with a constant voltage and current is connected the bridge circuit 7. A change in magnetic field affecting the MR element 6 is detected by converting a change in resistance value of the MR element to a change in electric voltage. This conventional magnetic detection device comprises: the MR element 6; the bridge circuit 7 composed of the resistors 8, 9 and 10; the comparator 13 for outputting a low-level or high-level signal by comparing a voltage at a contact point 11 of this bridge circuit 7 with a reference value 12 of resistors 9 and 10; and an output transistor 14 for receiving an output from the comparator 13 and switching accordingly.

The MR element 6 is connected to the power supply terminal VCC and the resistor 8 is grounded. The contact point 11 between the resistor 8 and the MR element 6 is connected to an inverted input terminal of the comparator 13. An non-inverted input terminal of the comparator 13 is connected to a contact point 12 between the resistors 9 and 10 for generating a reference voltage. The output terminal of the comparator 13 is connected to a base of the output transistor 14 and an emitter thereof is grounded. A collector of the output transistor 14 serving as an output terminal is connected to the power supply terminal VCC in the computer unit 20 through the resistor 15 and is also connected to the inverted input terminal of the comparator 16. The non-inverted input terminal of the comparator 16 is connected to the voltage-dividing circuit of the resistors 18 and 19 for generating a reference voltage (a reference value 17).

FIG. 24 shows waveform diagrams a, b, c, and d each for the corresponding parts a, b, c and d of the circuit diagram shown in FIG. 23 when the toothed magnetic rotor is rotated. When rotating the toothed magnetic rotor 4, a change in bias magnetic field is given to the MR element 6, and an output a corresponding to the concave and convex portions of the toothed magnetic rotor 4 is obtained at the contact point 11 of the bridge circuit 7. This output a is supplied to the comparator 13 where the output is compared with the reference value 12 and is converted to an output b, which is further converted into a binary signal c. This signal c is then formed into a waveform in the computer unit 20 and is then output as a binary signal output d with steep rising and falling transitions. The rotation angle for the toothed magnetic rotor 4 is detected by counting this pulse-shaped output d (not illustrated).

However, in the conventional magnetic detection device of above arrangement, the output c given by the output transistor 14 or the output d given by the computer unit 20 is a binary signal of low or high level in the aspect of signal form. Because signal form of the output remains unchanged irrespective of whether the toothed magnetic rotor 4 is rotated in forward direction or in reverse direction, a problem exists in that it is impossible to detect rotating direction of the toothed magnetic rotor 4.

SUMMARY OF THE INVENTION

The present invention was made to resolve the above-discussed problem and has an object of providing a magnetic detection device capable of detecting moving direction of the toothed magnetic movable body.

A magnetic detection device according to the invention comprises: a magnet for generating a bias magnetic field; first and second magneto-resistance effect element units facing to a toothed magnetic movable body to be detected and located in moving direction thereof within the bias magnetic field of the magnet, and of which resistance changes according to change in condition of the bias magnetic field corresponding to movement of the mentioned object to be detected; a first resistance change output circuit for outputting change in resistance of the mentioned first magneto-resistance effect element units; a second resistance change output circuit for outputting change in resistance of the mentioned second magneto-resistance effect element units; and an output signal processing circuit for outputting a first signal according to phase difference between an output of the mentioned first resistance change output circuit and an output of the mentioned second resistance change output circuit based on the movement of the mentioned object to be detected in forward direction, and for outputting a second signal according to phase difference between outputs of the mentioned first and second resistance change output circuits based on the movement of the mentioned object to be detected in reverse direction.

As a result of such arrangement, it becomes possible to detect moving direction of the toothed magnetic moving object using the first signal and the second signal of which values are different from each other.

Another magnetic detection device according to the invention comprises: a magnet for generating a bias magnetic field; first and second magneto-resistance effect element units facing to a toothed magnetic movable body to be detected and located in moving direction thereof within the bias magnetic field of the magnet, and of which resistance changes according to change in condition of the bias magnetic field corresponding to movement of the mentioned object to be detected; a first resistance change output circuit for outputting change in resistance of the mentioned first magneto-resistance effect element units; a second resistance change output circuit for outputting change in resistance of the mentioned second magneto-resistance effect element units; and an output signal processing circuit for outputting a first signal according to phase difference between an output of the mentioned first resistance change output circuit and an output of the mentioned second resistance change output circuit based on the movement of the mentioned object to be detected in forward direction and generating pulses of high level 1 and low level 1 by the mentioned first signal output and the output of the mentioned resistance change output circuit, and for outputting a second signal according to phase difference between outputs of the mentioned first and second resistance change output circuits based on the movement of the mentioned object to be detected in reverse direction and generating pulses of high level 2 and low level 2, which are different from either the mentioned high level 1 or the mentioned low level 1, by the mentioned second signal output and the output of the mentioned resistance change output circuit.

As a result of such arrangement, it becomes possible to detect moving direction of the toothed magnetic movable body using the pulses of high level 1 and low level 1 and using the pulses of high level 2 and low level 2. Furthermore, since the high level 2 and the low level 2 are different from either the high level 1 or the low level 1, at least different three values are provided, eventually resulting in increase in the amount of information available for controlling the system.

A further magnetic detection device according to the invention comprises: a magnet for generating a bias magnetic field; first and second magneto-resistance effect element units facing to a toothed magnetic movable body to be detected and located in moving direction thereof within the bias magnetic field of the magnet, and of which resistance changes according to change in condition of the bias magnetic field corresponding to movement of the mentioned object to be detected; a first resistance change output circuit for outputting change in resistance of the mentioned first magneto-resistance effect element units; a second resistance change output circuit for outputting change in resistance of the mentioned second magneto-resistance effect element units; and an output signal processing circuit for outputting a first signal due to the mentioned first resistance change output circuit of which output is generated earlier than that of the mentioned second resistance change output circuit based on movement of the mentioned object to be detected in forward direction and generating pulses of high level 1 and low level 1 by the mentioned first signal output and the output of the mentioned resistance change output circuit, for outputting a second signal due to the mentioned second resistance change output circuit of which output is generated earlier than that of the mentioned first resistance change output circuit based on the movement of the mentioned object to be detected in reverse direction and generating pulses of high level 2 and low level 2, which are different from either the mentioned high level 1 or the mentioned low level 1, by the mentioned second signal output and the out put of the mentioned resistance change output circuit.

As a result of such arrangement, it becomes possible to detect moving direction of the toothed magnetic movable body using the pulses of high level 1 and low level 1 and using the pulses of high level 2 and low level 2. Furthermore, since the high level 2 and the low level 2 are different from either the high level 1 or the low level 1, at least different three values are provided, eventually resulting in increase in the amount of information available for controlling the system.

It is preferable that the output signal processing circuit includes a D flip-flop circuit. As a result, a circuit of simple arrangement can detect moving direction.

It is preferable that the output signal processing circuit generates pulses by inputting the output from the first resistance change output circuit to an output transistor and a D terminal of a D flip-flop circuit, inputting the output from the second resistance change output circuit to a CL terminal of the mentioned D flip-flop circuit and combining outputs from the mentioned D flip-flop circuit and the mentioned output transistor. As a result, a circuit of simple arrangement can detect moving direction.

It is preferable that the first magneto-resistance effect element unit is a serially connected unit composed of two magneto-resistance effect elements connected in series, and the second magneto-resistance effect element unit is a serially connected unit composed of two magneto-resistance effect elements connected in series. As a result, a detection magnetic device of superior temperature characteristic can be obtained.

It is preferable that one magneto-resistance effect element of the first magneto-resistance effect element unit and one magneto-resistance effect element of the second magneto-resistance effect element unit are located in the center, and the other magneto-resistance effect element of the first magneto-resistance effect element unit and the other magneto-resistance effect element of the second magneto-resistance effect element unit are located on two sides sandwiching the mentioned magneto-resistance effect elements therebetween, in moving direction of the toothed magnetic movable body. As a result, a detection magnetic device of superior temperature characteristic can be obtained.

It is preferable that a GMR element (giant magneto-resistance effect element) is used as the magneto-resistance effect element. As a result, characteristics of the device are improved.

DESCRIPTION OF THE PREFERRED EMBODIMENTS

EXAMPLE 1

Figure 1:
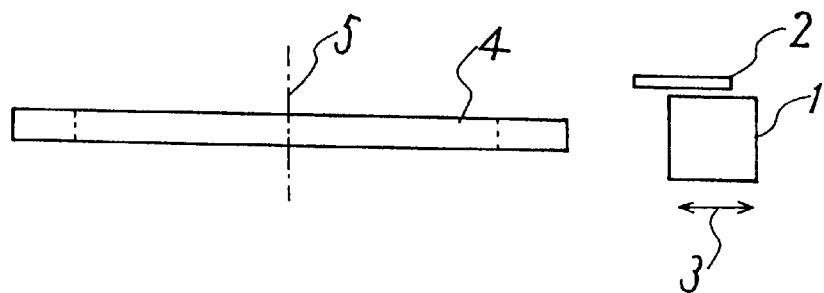
FIGS. 1(a), (b) and (c) are schematic views each showing a magnetic detection device according to Example 1 of the present invention.
Figure 1:
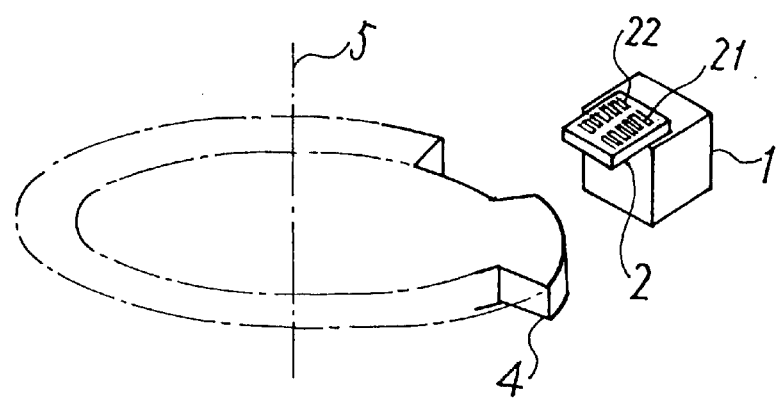
Figure 1:
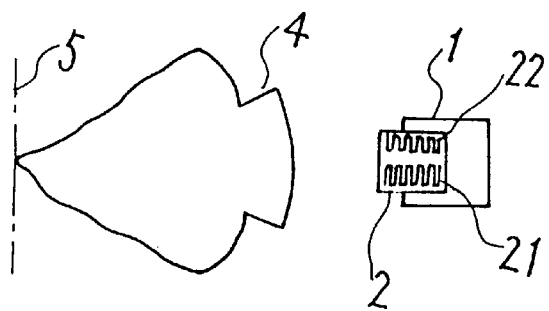
Figure 2:
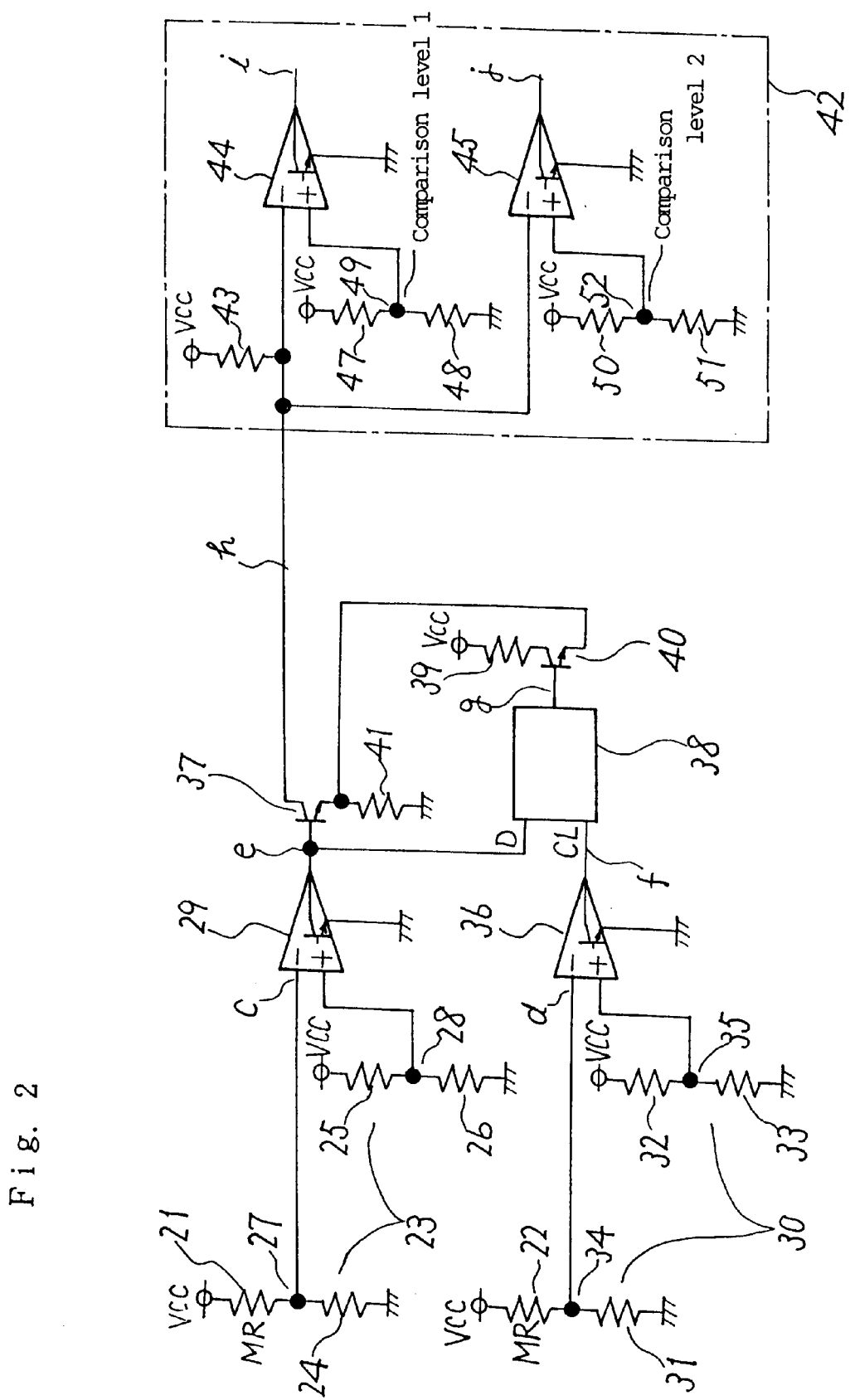
FIG. 2 is an electric circuit diagram showing the magnetic detection device according to Example 1 of the invention.
Figure 22:
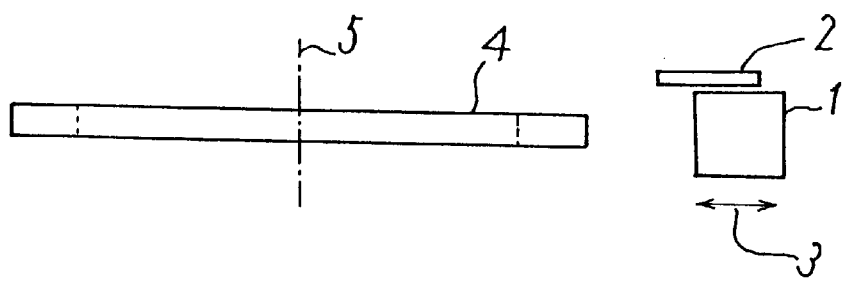
FIG. 22 is a block diagram of a magnetic detection device according to the prior art.
Figure 22:
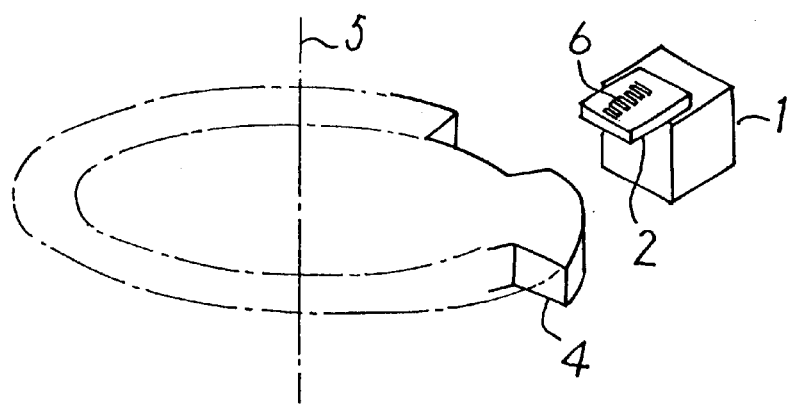
Figure 22:
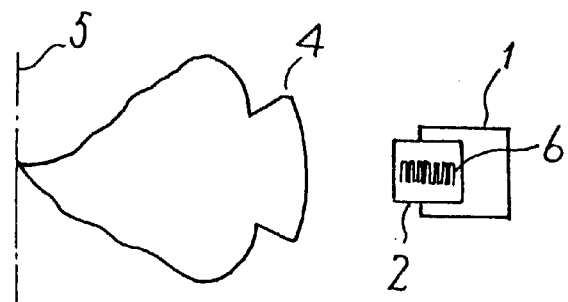
Figure 23:
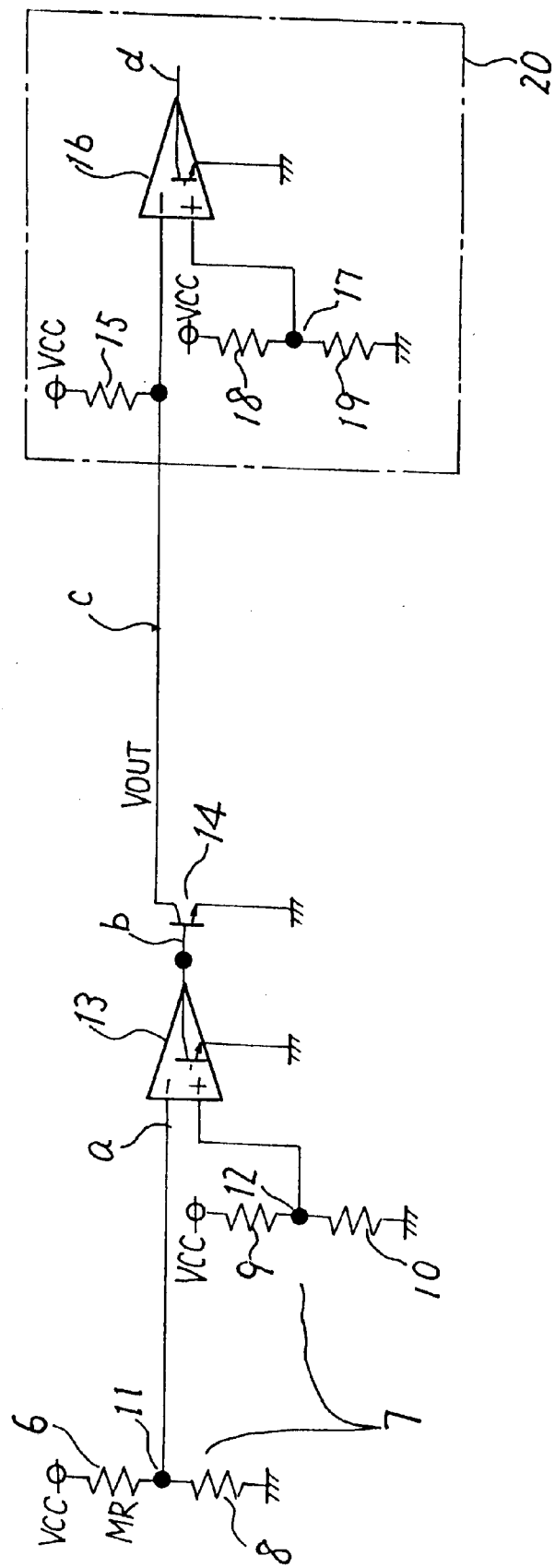
FIG. 23 is an electric circuit diagram of the magnetic detection device according to the prior art.
Figure 24:
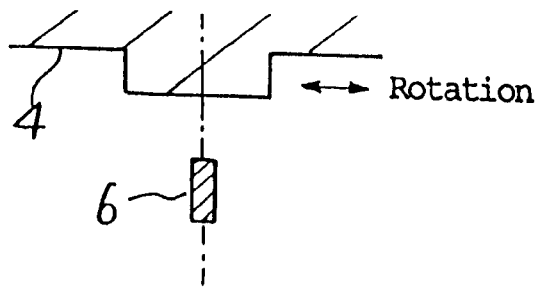
FIG. 24 is waveform diagram of the electric circuit diagram in FIG. 23.
Figure 24:
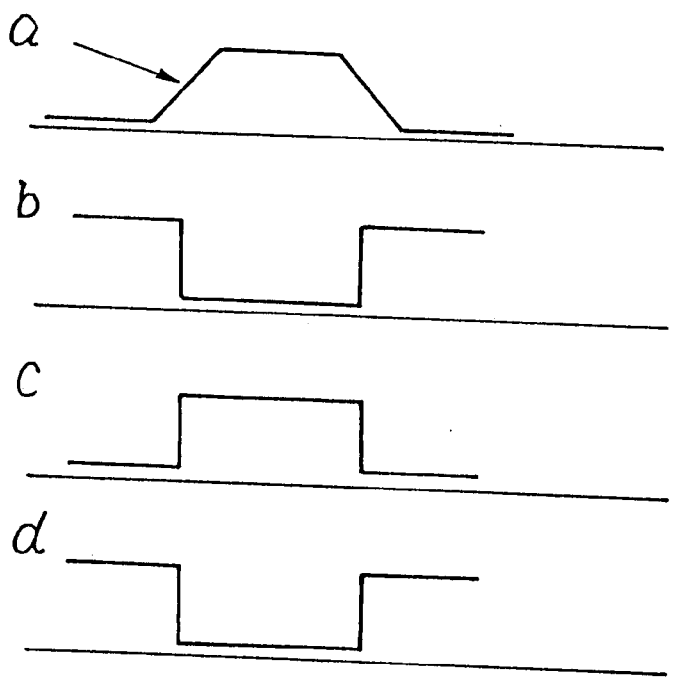

FIGS. 1(a), (b) and (c) are schematic views each showing a magnetic detection device according to Example 1 of the present invention, and in which (a) is a front view, (b) is a perspective view, and (c) is a partial top view. FIG. 2 is an electric circuit diagram showing the magnetic detection device according to Example 1 of the invention and FIGS. 3(a) and (b) are waveform diagrams each showing the electric circuit diagram in FIG. 2. In this Example 1, two first and second magneto-resistance effect elements (hereinafter referred to as MR element) 21 and 22 are located facing to a toothed magnetic rotor 4 in the rotating direction thereof, and two bridge circuits are formed of the first and second MR elements 21 and 22 and corresponding resistors. In addition, the same reference numerals are designated to the same or like parts in FIG. 22 to FIG. 24.

The magnetic detection device according to this Example 1 possesses a rectangular parallelepiped magnet 1 for a generating bias magnetic field, and an IC chip 2 mounted on the upper surface of the magnet 1 and forming integrally the two first and second MR elements 21 and 22 serving as a magnetic detection element. The magnetic detection device is caused to face to and come near the toothed magnetic rotor 4, and the first and second MR elements 21 and 22 are located in the rotating direction of the toothed magnetic rotor 4. Concave and convex parts of the toothed magnetic rotor 4 come near alternately the first and second MR elements 21 and 22 of the magnetic detection device when the toothed magnetic rotor 4 is rotated. As a result, a magnetic field applied from the magnet 1 to the first and second MR elements 21 and 22 is changed. The change in magnetic field is converted to a change in resistance of the first and second MR elements 21 and 22. Thus, it becomes possible to obtain an output of the two bridge circuits in the form of a change in voltage.

Numeral 23 is a bridge circuit composed of the first MR element 21, and the resistors 24, 25 and 26. The first MR element 21 is preferably connected to a power supply VCC of a constant voltage and constant current, and the resistor 24 is grounded to the earth. A contact point 27 between the first MR element 21 and the resistor 24 is connected to an inverted input terminal of a first comparator 29. One end of the resistors 25 and 26 is connected to the power supply VCC, and the other ends are grounded to the earth. A contact point 28 between the resistors 25 and 26 is connected to a non-inverted input terminal of the first comparator 29 to serve as a reference value. In the same manner, numeral 30 is a bridge circuit composed of the second MR element 22, and the resistors 31, 32 and 33. The second MR element 22 is preferably connected to a power supply VCC of a constant voltage and constant current, and the resistor 31 is grounded to the earth. A contact point 34 between the second MR element 22 and the resistor 31 is connected to an inverted input terminal of a second comparator 36. One end of the resistors 32 and 33 is connected to the power supply VCC, and the other ends are grounded to the earth. A contact point 35 between the resistors 32 and 33 is connected to a non-inverted input terminal of the second comparator 36 to serve as a reference value. Note that, in this embodiment, the first MR element 21 and resistor 24 form a first magneto-resistance effect element unit, and the second MR element 22 and the resistor 31 form a second magneto-resistance effect element unit.

Output from each of these two system bridge circuits is converted to a rectangular wave at the first and second comparators (first and second resistance change output circuits) 29 and 36. One output signal (from the first comparator 29) is connected to the base of an open-collector type output transistor 37 and a D terminal of a D flip-flop 38, and the other output signal (from the second comparator 36)

is connected to a CL terminal. The output terminal of the D flip-flop 38 is connected to the base of a transistor 40 which is connected to the power supply terminal VCC through the resistor 39, and the emitter of the transistor 40 is connected to the emitter of the output transistor 37 and is grounded to the earth through the resistor 41. Note that the D flip-flop 38 is well known and keeps the output in the previous condition whenever the CL input is L (Low) regardless of the level of the D terminal. Output of the D flip-flop 38 is H when the CL input is a rising edge trigger for H and the D terminal is H, while output is L when the D terminal is L.

After being transferred to the computer unit 42, the output signal from the output transistor 37 is connected to a power supply terminal VCC through a resistor 43 in the computer unit 42 and is further connected to inverted input terminals of two third and fourth comparators 44 and 45. One end of the resistors 47 and 48 is connected to a power supply VCC, the other ends are grounded to the earth, and a contact point 49 between resistors 47 and 48 is connected to a non-inverted input terminal of a third comparator 44 to serve as a comparison level 1 (reference voltage). In the same manner, one end of the resistors 50 and 51 is connected to a power supply VCC, the other ends are grounded to the earth, and a contact point 52 between resistors 50 and 51 is connected to a non-inverted input terminal of the fourth comparator 45 to serve as the comparison level 2 (reference voltage). The comparison levels 1 and 2 for these third and fourth comparators 44 and 45 are different from each other so that comparison level 1>comparison level 2. Therefore, output signals of the third and fourth comparators 44 and 45 are different. In addition, output signal processing circuits of the first and second comparators 29, 36 are formed in the process from the output transistor 37 to contact points 52.

Figure 3:
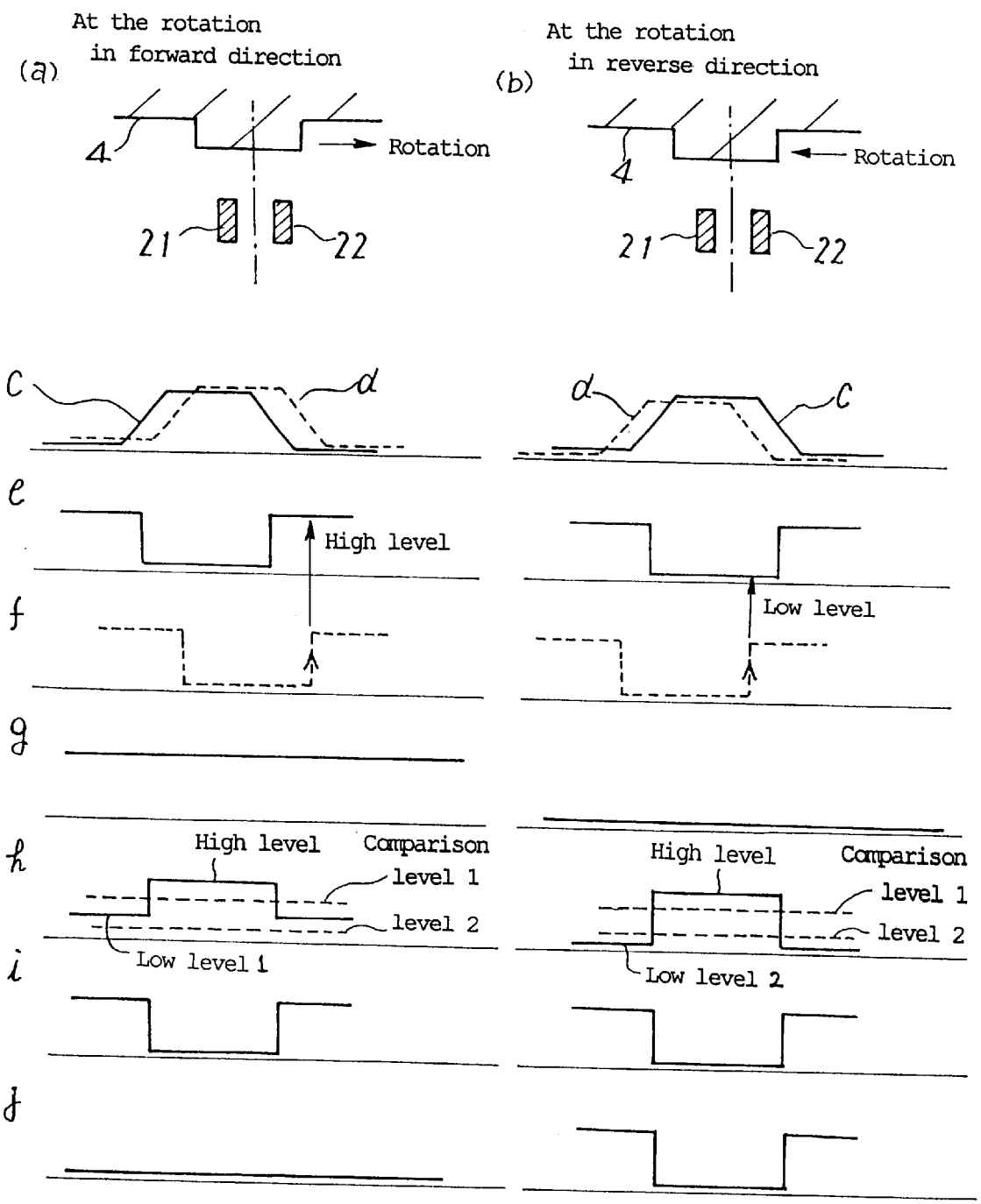
FIGS. 3(a) and (b) are waveform diagrams each showing the electric circuit diagram in FIG. 2.

Operation is hereinafter described. FIG. 3 is a waveform diagram showing waveforms c to j corresponding to parts c to j of the electric circuit diagram in FIG. 2, and in which (a) shows a condition when the toothed magnetic rotor 4 is rotated in forward direction and (b) shows a condition when the toothed magnetic rotor 4 is rotated in reverse direction. When rotating in forward direction as shown in FIG. 3(a), the MR element 21 comes near the toothed magnetic rotor 4 earlier than the MR element 22. Therefore, phase (generation timing) comes earlier in an output e of the first comparator 29 due to the signal c of the bridge circuit 23 on the MR element 21 side than that of the output f of the second comparator 36 due to the signal d of the bridge circuit 30 on the MR element 22 side.

As a result, when using the rising-transition-edge trigger type D flip-flop 38, the output g from the D flip-flop 38 is kept at a high level (first signal). The transistor 40 connected to the output from the flip-flop 38 is tuned on and supplies an electric current to the resistor 41 connected between the emitter of the output transistor 37 and the ground. When the output transistor 37 is off, the output h level is at the high level determined on the basis of the electric voltage of the power supply terminal VCC in the computer unit 42 regardless of whether the rotating direction is in forward or reverse. When the output transistor 37 is on, the output h level is at the low level 1 determined on the basis of a sum of the electric current supplied by the output transistor 37 and the electric current supplied by the transistor 40 connected to the output of the D flip-flop 38, the sum being multiplied by the resistor 41 connected between the emitter of the output transistor 37 and the ground to obtain a product.

On the other hand, when rotating in reverse direction as shown in FIG. 3(b), the MR element 22 comes near the toothed magnetic rotor 4 earlier than the MR element 21. Therefore, phase (generation timing) comes earlier in an output f of the second comparator 36 due to the signal d of the bridge circuit 30 on the MR element 22 side than that of the output e of the first comparator 29 due to the signal c of the bridge circuit 23 on the MR element 21 side.

As a result, the output g generated from the D flip-flop 38 is kept at the low level (second signal) at all times, and the transistor 40 connected to the output from the D flip-flop 38 is off. This prevents an electric current from being supplied to the transistor 41 connected between the emitter of the output transistor 37 and the ground through the transistor 40. Accordingly, when the output transistor 37 is on, the output h level is comes to the low level 2 determined on the basis of the product of the electric current supplied from the output transistor 37 and the transistor 41 connected between the emitter of the output transistor 37 and the ground. At this time, the output h level is indicated by three different values. The level is in order of high level>low level 1>low level 2. Such a simple circuit can provide an increased amount of information.

In this manner, the output g from the D flip-flop 38 comes to a high level (first signal) at the rotation in forward direction and comes to a low level (second signal) at the rotation in reverse direction. Accordingly, it becomes possible to detect the rotating direction from the value of the output g of the D flip-flop 38. Further, the output h level of output transistor 37 provides binary signal pulses of the high level and the low level 1 at the rotation in forward direction, and provides binary signal pulses of the high level and the low level 2 at the rotation in reverse direction. Therefore, it becomes possible to detect the rotating direction using the values of low level 1 and low level 2.

Further, by applying the output h of the output transistor 37 to the computer unit 42, setting the comparison level 1 of the third comparator 44 in the computer unit 42 to be an intermediate level between the high level and the low level 1, and setting the comparison level 2 of the fourth comparator 45 to be an intermediate level between the low level 1 and the low level 2, it becomes possible to detect the rotating direction. In other words, the situation where no signal is generated at the output j of the fourth comparator 45 indicates the rotation in forward direction and the situation where a signal is generated indicates the rotation in reverse direction. In addition, a signal is generated at the output i of the third comparator 44 at the rotation in both forward and reverse directions.

Further, as is understood from the waveform diagram in FIG. 3, the signal c (pulse) of the bridge circuit 23 on the MR element 21 side corresponding to the position of teeth of the toothed magnetic rotor 4 is synchronized with the pulse of the output h of the output transistor 37 regardless of the rotating direction. Therefore, it is possible to recognize the facing condition of the toothed magnetic rotor 4 (whether a protruded portion or a non-protruded portion of the toothed magnetic rotor 4 is facing), which is useful for a control system requiring such a function.

Furthermore, use of a GMR element instead of a MR element can boost the output of the bridge circuit, whereby the detection becomes possible even if there is a large distance between the toothed magnetic rotor 4 and the magnetic detection device, resulting in increase in characteristics of the device. As mentioned above, change rate of the GMR element is approximately 30% as compared with the change rate of 2 to 6% of the MR element. This can boost the output from the bridge circuit to 5 to 15 times as much as that of the MR element.

EXAMPLE 2

Figure 4:
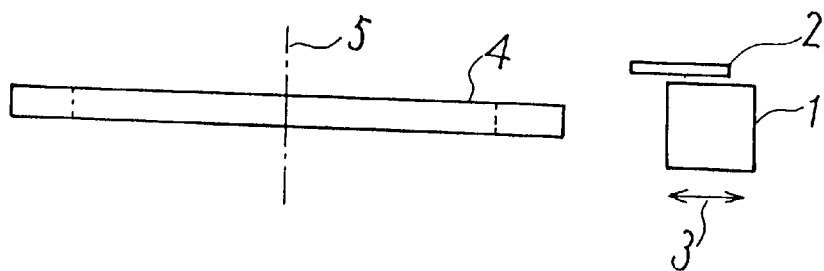
FIGS. 4(a), (b) and (c) are schematic views each showing a magnetic detection device according to Example 2 of the invention.
Figure 4:
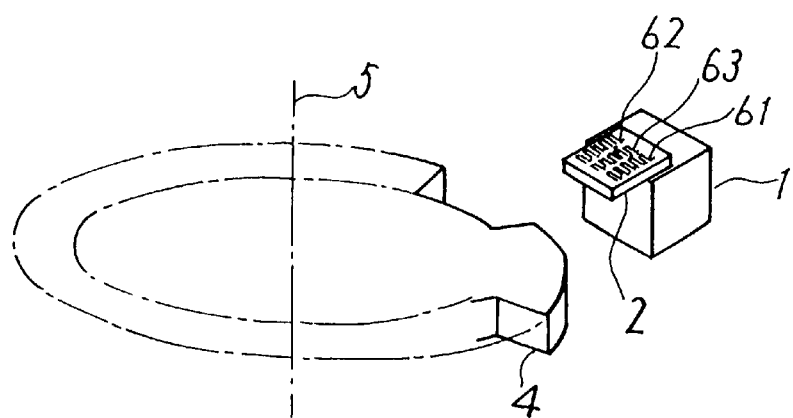
Figure 4:
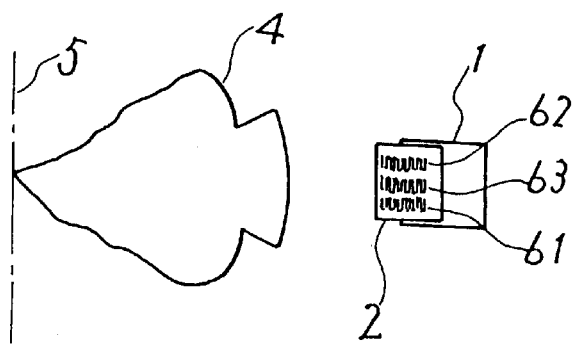
Figure 5:
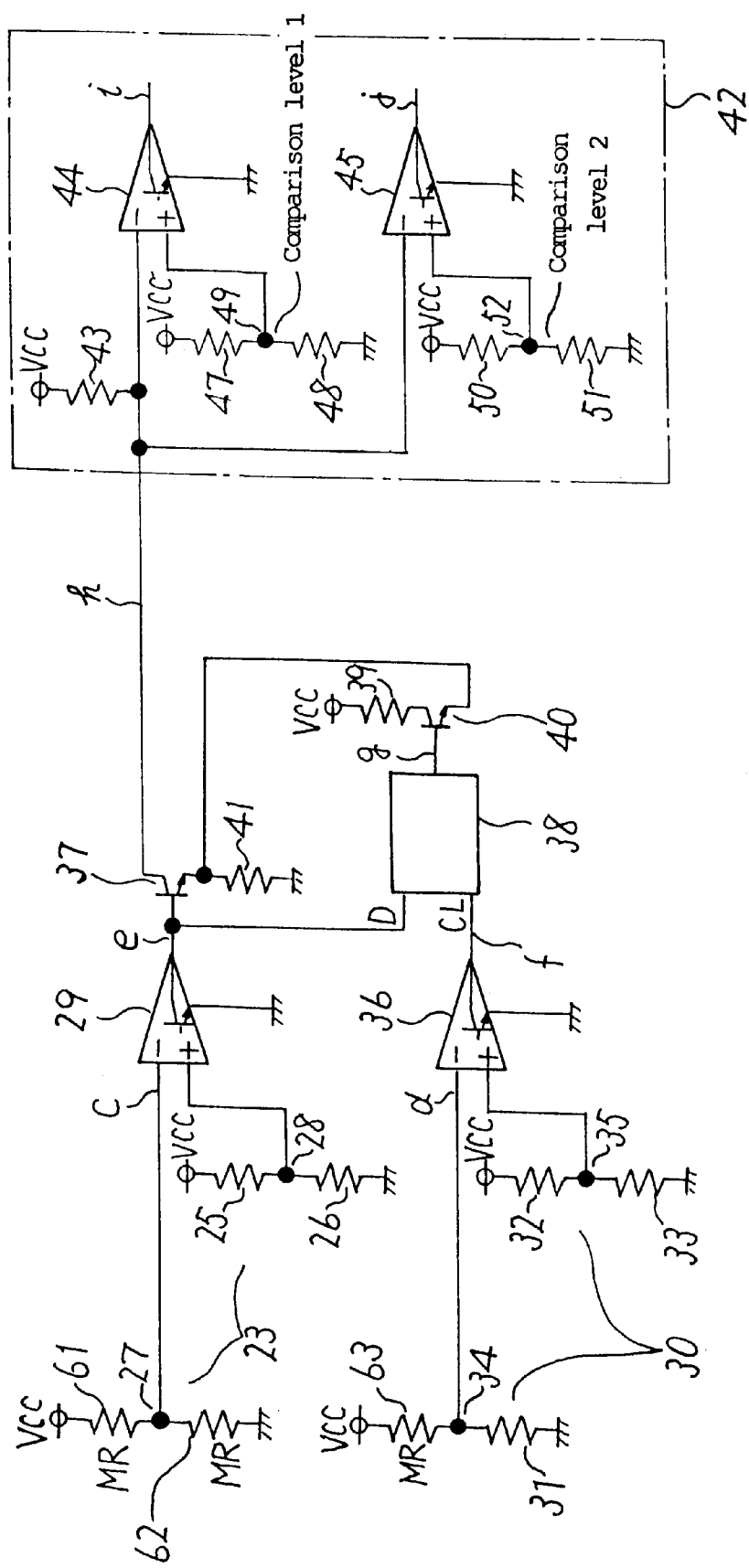
FIG. 5 is an electric circuit diagram of the magnetic detection device according to Example 2 of the invention.
Figure 6:
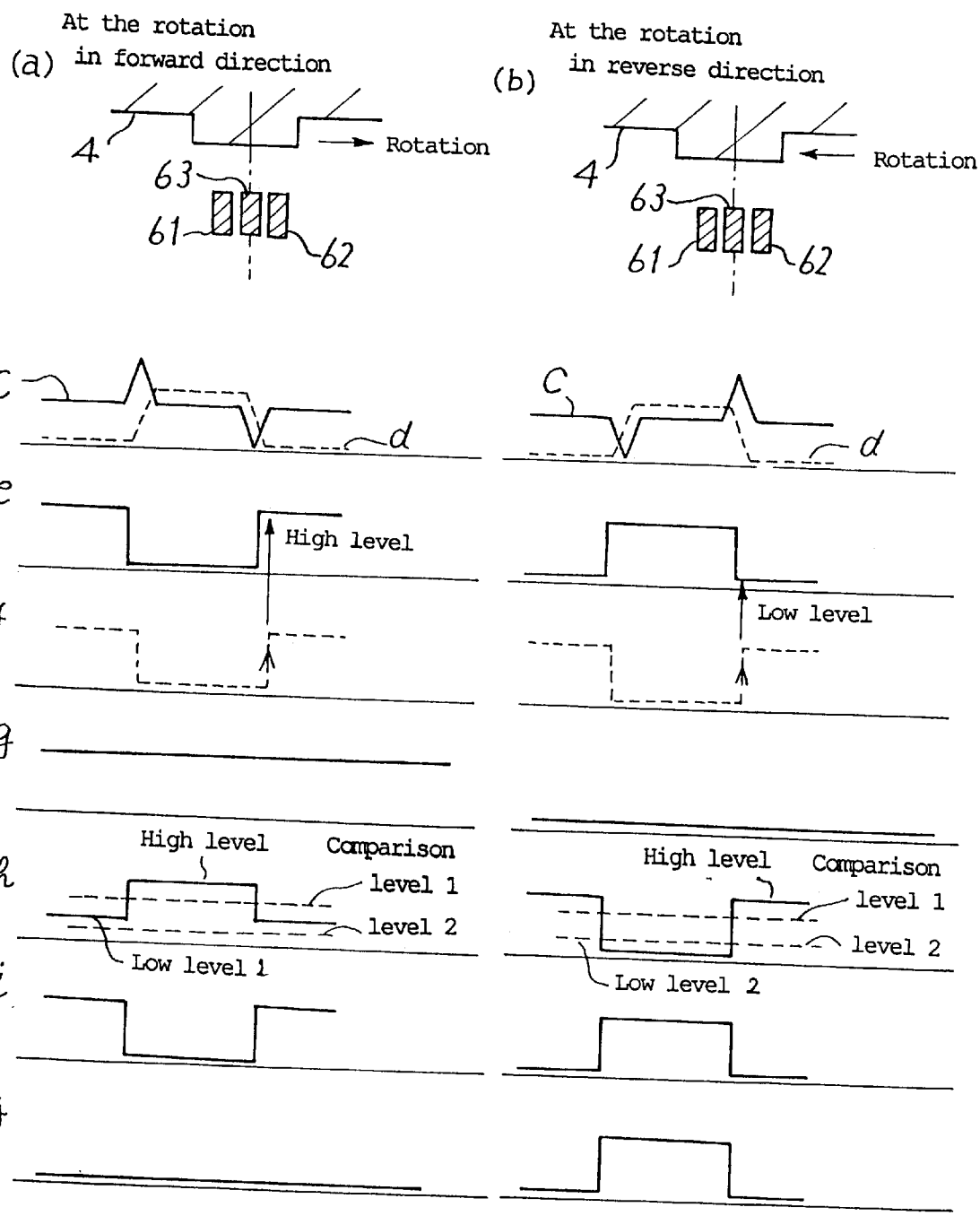
FIGS. 6(a) and (b) are schematic views each showing the electric circuit diagram in FIG. 5.

FIGS. 4(a), (b) and (c) are schematic views each showing a magnetic detection device according to Example 2 of the invention, and in which (a) is a front view, (b) is a perspective view and (c) is a partial top view. FIG. 5 is an electric circuit diagram of the magnetic detection device according to Example 2 of the invention. FIGS. 6(a) and (b) are schematic views each showing the electric circuit diagram in FIG. 5. In this Example 2, three first, second and third magneto-resistance effect elements (hereinafter referred to as MR element) 61, 62 and 63 are located facing to the toothed magnetic rotor 4 in the rotating direction of the rotor 4. In the drawings, the same reference numerals as those in FIG. 22 to FIG. 24 and FIGS. 1 to 3 are designated to the same or like parts.

As shown in FIG. 5, the first bridge circuit 23 is formed of the first and second MR elements 61 and 62 located at both ends in combination with the resistors 25 and 26. The second bridge circuit 30 is formed of the third MR element 63 located in the center in combination with the resistors 31, 32 and 33.

In the forward rotating direction, since the MR elements exhibit reduced resistance in order of the MR elements 61, 63 and 62, the waveforms at the contact points 27 and 34 are as indicated by c and d in FIG. 6(a) respectively. Then, output waveforms of the first and second comparators 29 and 36 are as indicated by e and f in FIG. 6(a). Due to the phase difference between the output e and the output f, the output e is at a high level at the time of rising of the output f. As a result, the output g from the D flip-flop 38 is kept at the high level (first signal) at all times. In the same manner as in the foregoing Example 1, waveform at each part g, h, i and j in FIG. 5 corresponds to g, h, i and j in FIG. 6(a).

In the reverse rotating direction, since the MR elements exhibit reduced resistance in order of the MR elements 62, 63 and 61, the waveforms of the contact points 27 and 34 are as indicated in c and d in FIG. 6(b) respectively. Then, output waveforms of the first and second comparators 29 and 36 are as indicated by e and f in FIG. 6(b). Due to the phase difference between the output e and the output f, the output e is at a low level at the time of rising of the output f. As a result, the output g from the D flip-flop 38 is kept at the low level (second signal) at all times. In this manner, waveform at each part g, h, i and j in FIG. 5 corresponds to g, h, i and j in FIG. 6(b).

As described above, the output g from the D flip-flop 38 comes to the high level (first signal) at the rotation in forward direction and comes to the low level (second signal) at the rotation in reverse direction. Therefore, it becomes possible to detect the rotating direction using the output g of the D flip-flop 38. Further, the output h level of output transistor 37 provides binary signal pulses of the high level and the low level 1 at the rotation in forward direction, and provides binary signal pulses of the high level and the low level 2 at the rotation in reverse direction. Therefore, it becomes possible to detect the rotating direction using the values of low level 1 and low level 2.

Further, by applying the output h of the output transistor 37 to the computer unit 42, setting the comparison level 1 of the third comparator 44 in the computer unit 42 to be an intermediate level between the high level and the low level 1, and setting the comparison level 2 of the fourth comparator 45 to be an intermediate level between the low level 1 and the low level 2, it becomes possible to detect the rotating direction. In other words, the situation where no signal is generated at the output j of the fourth comparator 45 indicates the rotation in forward direction and the situation where a signal is generated indicates the rotation in reverse direction. In addition, a signal is generated at the output i of the third comparator 44 at the rotation in both forward and reverse directions.

EXAMPLE 3

Figure 7:
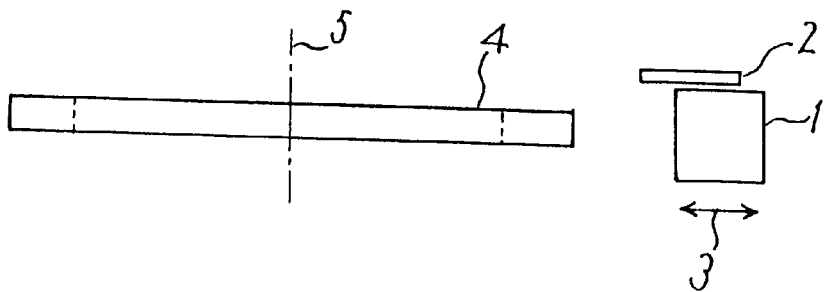
FIGS. 7(a), (b) and (c) are schematic views each showing a magnetic detection device according to Example 3 of the invention.
Figure 7:
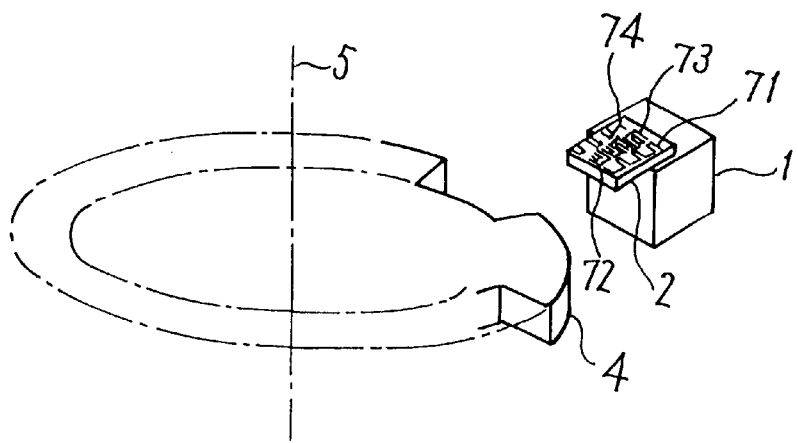
Figure 7:
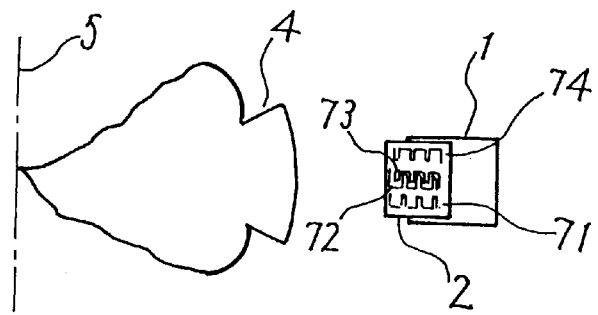
Figure 8:
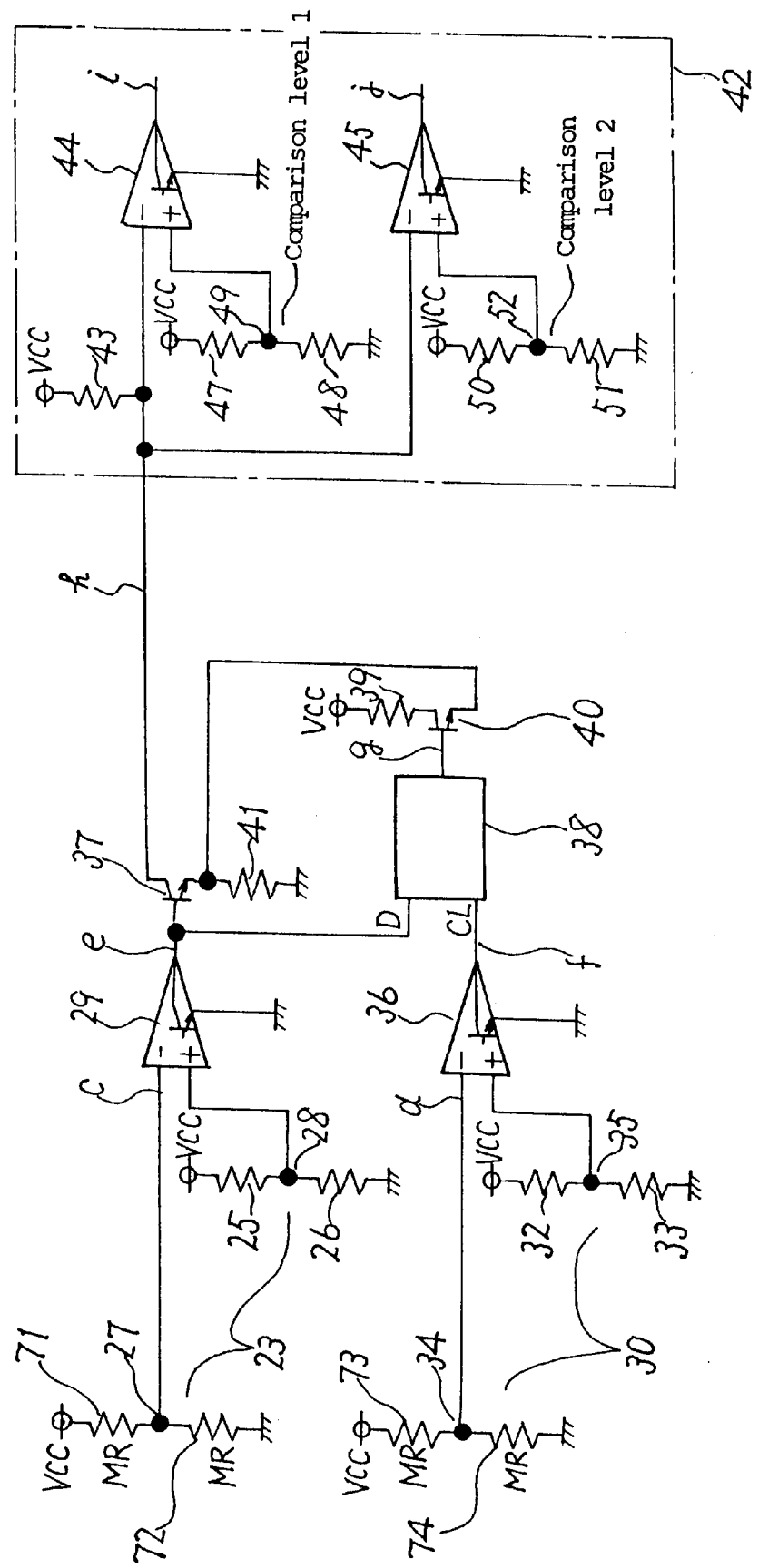
FIG. 8 is an electric circuit diagram of the magnetic detection device according to Example 3 of the invention.
Figure 9:
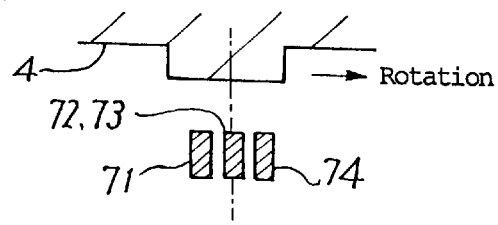
FIGS. 9(a) and (b) are schematic views each showing the electric circuit diagram in FIG. 8.
Figure 9:
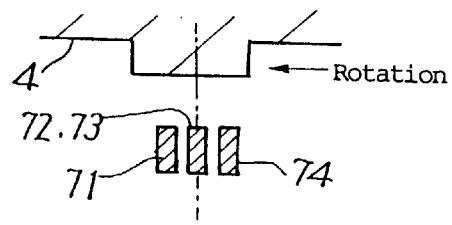
Figure 9:
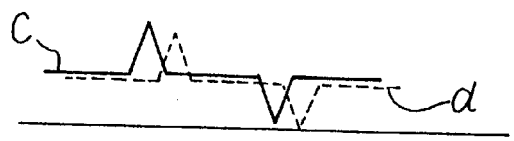
Figure 9:
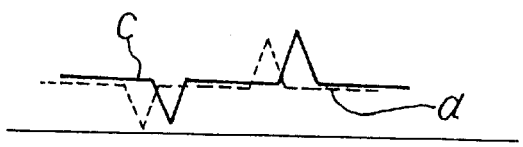
Figure 9:
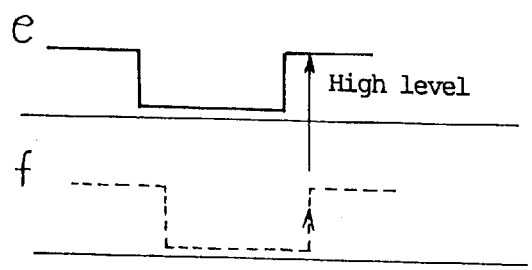
Figure 9:
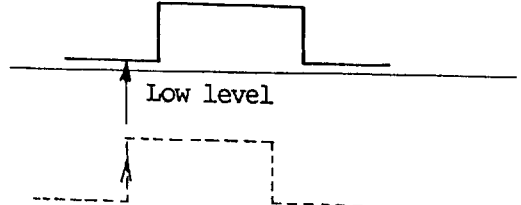
Figure 9:
Figure 9:
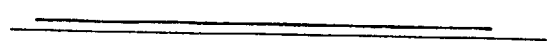
Figure 9:
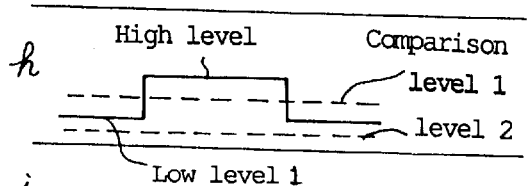
Figure 9:
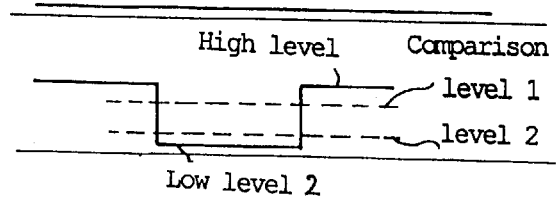
Figure 9:
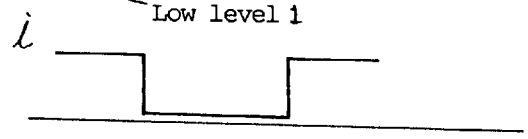
Figure 9:
Figure 9:
Figure 9:

FIGS. 7(a), (b) and (c) are schematic views each showing a magnetic detection device according to Example 3 of the invention, and in which (a) is a front view, (b) is a perspective view and (c) is a partial top view. FIG. 8 is an electric circuit diagram of the magnetic detection device according to Example 3 of the invention. FIGS. 9(a) and (b) are schematic views each showing the electric circuit diagram in FIG. 8.

In this Example 3, four first, second, third and fourth magneto-resistance effect elements (hereinafter referred to as MR element) 71, 72, 73 and 74 are located facing to the toothed magnetic rotor 4 in the rotating direction thereof. As shown in FIG. 7(c), two MR elements 72 and 73 to be located in the center are brought near each other, and the MR elements 71 and 74 are located at both ends sandwiching the MR elements 72 and 73 therebetween, thus reducing an area occupied by the first to fourth MR elements 71 to 74 on the IC chip 2. In the drawings, the same reference numerals as those in FIG. 22 to FIG. 24 and FIGS. 1 to 6 are designated to the same or like parts.

As shown in FIG. 8, the first bridge circuit 23 is formed of the first and second MR elements 71 and 72 located at one end and in the center in combination with the resistors 25 and 26. The second bridge circuit 30 is formed of the third and fourth MR elements 73 and 74 located in the center and at the other end in combination with the resistors 32 and 33.

In the forward rotating direction, since the MR elements exhibit reduced resistance in order of the MR elements 71, 73 and 72, the waveforms at the contact points 27 and 34 are as indicated by c and d in FIG. 9(a) respectively. Then, output waveforms of the first and second comparators 29 and 36 are as indicated by e and f in FIG. 9(a). Due to the phase difference between the output e and the output f, the output e is at a high level at the time of rising of the output f. As a result, the output g from the D flip-flop 38 is kept at the high level (first signal) at all times. In the same manner as in the foregoing Example 1, waveform at each part g, h, i and j in FIG. 5 corresponds to g, h, i and j in FIG. 9(a).

In the reverse rotating direction, since the MR elements exhibit reduced resistance in order of the MR elements 74, 73, 72 and 71, the waveforms of the contact points 27 and 34 are as indicated in c and d in FIG. 9(b) respectively. Then, output waveforms of the first and second comparators 29 and 36 are as indicated by e and f in FIG. 9(b). Due to the phase difference between the output e and the output f, the output e is at a low level at the time of rising of the output f. As a result, the output g from the D flip-flop 38 is kept at the low level (second signal) at all times. In this manner, waveform at each part g, h, i and j in FIG. 5 corresponds to g, h, i and j in FIG. 9(b).

As described above, the output g from the D flip-flop 38 comes to the high level (first signal) at the rotation in forward direction and comes to the low level (second signal) at the rotation in reverse direction. Therefore, it becomes possible to detect the rotating direction using the output g of the D flip-flop 38. Further, the output h level of output transistor 37 provides binary signal pulses of the high level and the low level 1 at the rotation in forward direction, and provides binary signal pulses of the high level and the low level 2 at the rotation in reverse direction. Therefore, it becomes possible to detect the rotating direction using the values of low level 1 and low level 2.

Further, by applying the output h of the output transistor 37 to the computer unit 42, setting the comparison level 1 of the third comparator 44 in the computer unit 42 to be an intermediate level between the high level and the low level 1, and setting the comparison level 2 of the fourth comparator 45 to be an intermediate level between the low level 1 and the low level 2, it becomes possible to detect the rotating direction. In other words, the situation where no signal is generated at the output j of the fourth comparator 45 indicates the rotation in forward direction and the situation where a signal is generated indicates the rotation in reverse direction. In addition, a signal is generated at the output i of the third comparator 44 at the rotation in both forward and reverse directions.

Furthermore, in Example 3, since two MR elements of the same temperature characteristics are used to form the magneto-resistance effect element unit, there is an advantage of providing a magnetic detection device of superior temperature characteristic. That is, it becomes possible to overcome the problem of causing temperature drift in the output of the bridge circuit due to difference in temperature coefficient likely to occur between MR elements and resistors.

EXAMPLE 4

Figure 10:
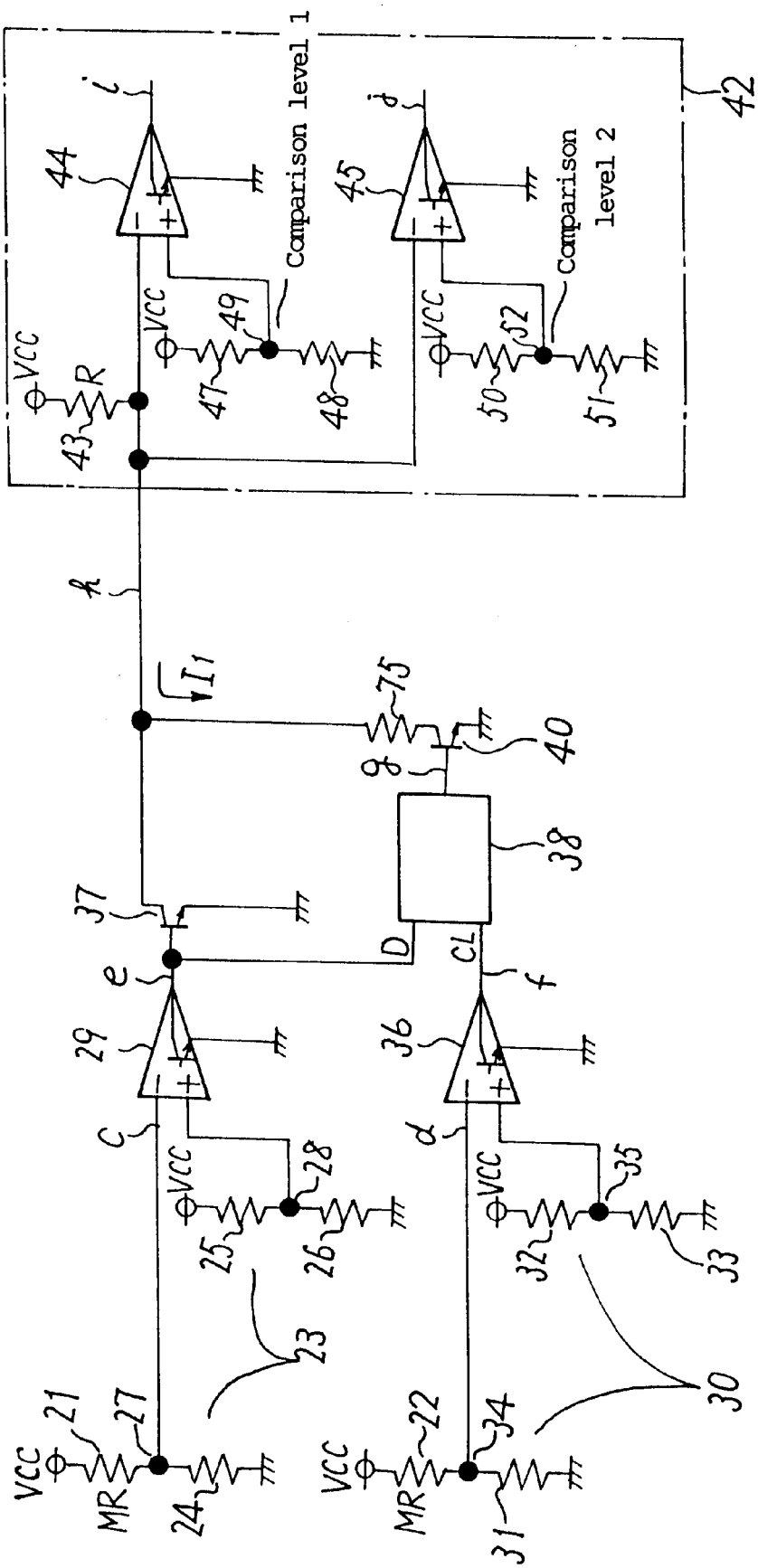
FIG. 10 is an electric circuit diagram of a magnetic detection device according to Example 4 of the invention.
Figure 11:
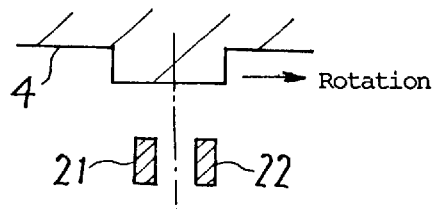
FIG. 11 is a waveform diagram of the electric circuit diagram in FIG. 10.
Figure 11:
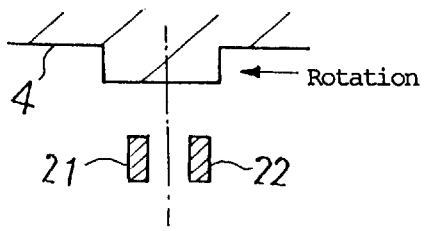
Figure 11:
Figure 11:
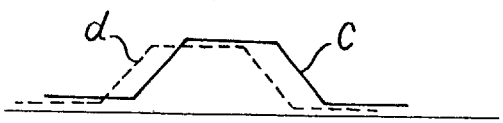
Figure 11:
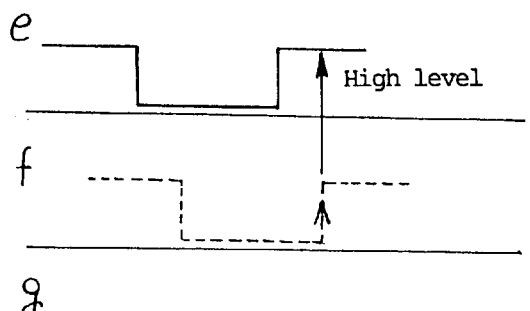
Figure 11:
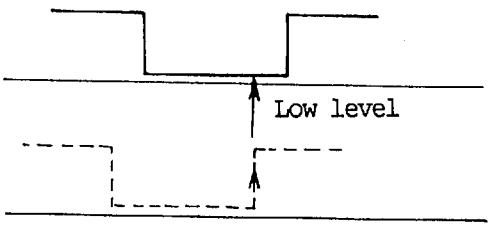
Figure 11:
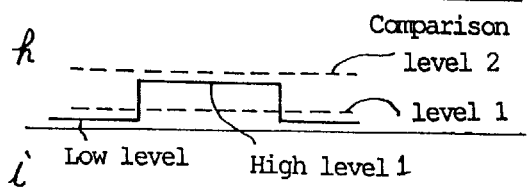
Figure 11:
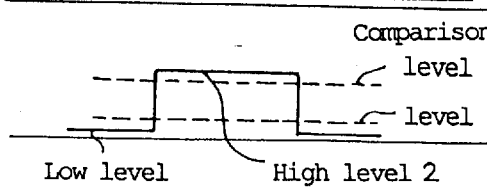
Figure 11:

FIG. 10 is an electric circuit diagram of a magnetic detection device according to Example 4 of the invention. FIG. 11 is a waveform diagram of the electric circuit diagram in FIG. 10. In FIG. 10, arrangement of circuit of the foregoing Example 1 shown in FIG. 2 is partially modified. The modified parts are the transistor 40 and the output transistor 37. Such modification will be focused on in the following description. In the drawings, the same reference numerals as those in FIG. 22 to FIG. 24 and FIGS. 1 to 3 are designated to the same or like parts.

The output terminal of the D flip-flop 38 is connected to the base of the transistor 40. The collector of the transistor 40 is connected to the output transistor 37 through the resistor 75, and the emitter is grounded to the earth together with the emitter of the output transistor 37. Referring to FIG. 11(a) showing the waveform diagram at the rotation in forward direction, the output g from the D flop-flip 38 is kept at the high level at all times, and therefore the transistor 40 is on, thereby causing an electric current $I_1$ to flow from the power supply terminal VCC in the computer unit 42. When the output transistor 37 is on, the output h comes to a low level determined on the basis of saturation voltage of the output transistor 37 regardless of whether the rotating direction is forward or reverse. However, when the output transistor 37 is off, the output h comes to the high level 1 which is smaller than the VCC by the product of the resistor 43 R and the electric current $I_1$ flowing in the transistor 40 connected to the output of the D flip-flop 38.

On the other hand, at the rotation in reverse direction as shown in FIG. 11(b), the output g from the D flip-flop 38 is kept at a low level at all times, and therefore the transistor 40 is off. As a result, when the transistor 37 is off, no electric current flows in the transistor 40, and the output h comes to the high level 2 (=VCC).

At this time, three values different depending upon the rotating direction forward or reverse indicate the output h levels. The level is in order of high level 2>high level 1>low level. Such a simple circuit can provide an increased amount of information.

Further, the output h level of output transistor 37 provides binary signal pulses of the high level 1 and the low level at the rotation in forward direction, and provides binary signal pulses of the high level 2 and the low level at the rotation in reverse direction. Therefore, it becomes possible to detect the rotating direction using the values of high level 1 and low level 2.

Further, by applying the output h of the output transistor 37 to the computer unit 42, setting the comparison level 1 of the third comparator 44 in the computer unit 42 to be an intermediate level between the high level 1 and the low level, and setting the comparison level 2 of the fourth comparator 45 to be an intermediate level between the high level 1 and the high level 2, it becomes possible to detect the rotating direction. In other words, the situation where no signal is generated at the output j of the fourth comparator 45 indicates the rotation in forward direction and the situation where a signal is generated indicates the rotation in reverse direction. In addition, a signal is generated at the output i of the third comparator 44 at the rotation in both forward and reverse directions.

In addition, the same operations and advantages as those in the foregoing Example 1 are performed in this Example 4, and further description is omitted herein.

EXAMPLE 5

Figure 12:
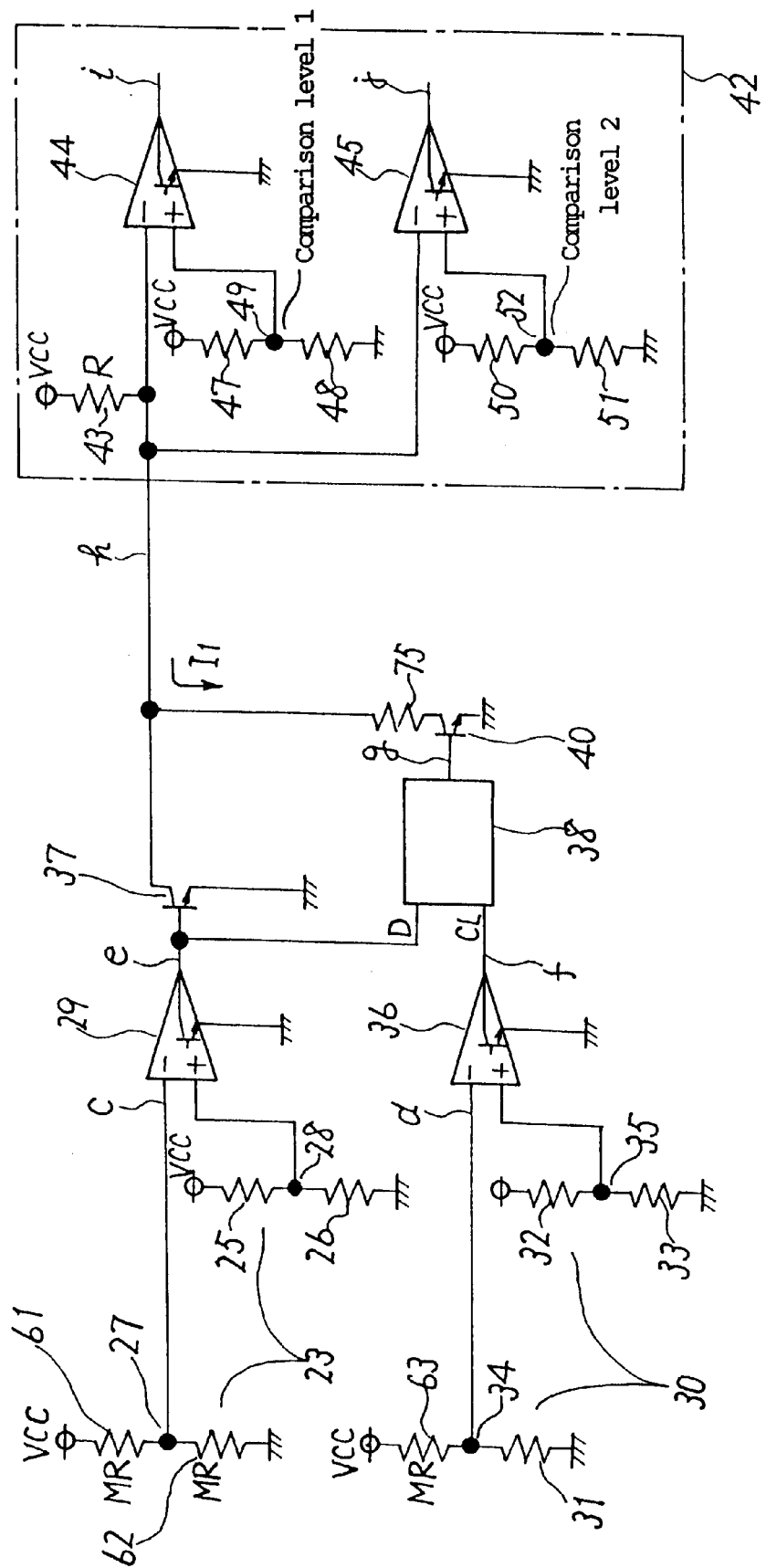
FIG. 12 is an electric circuit diagram of a magnetic detection device according to Example 5 of the invention.
Figure 13:
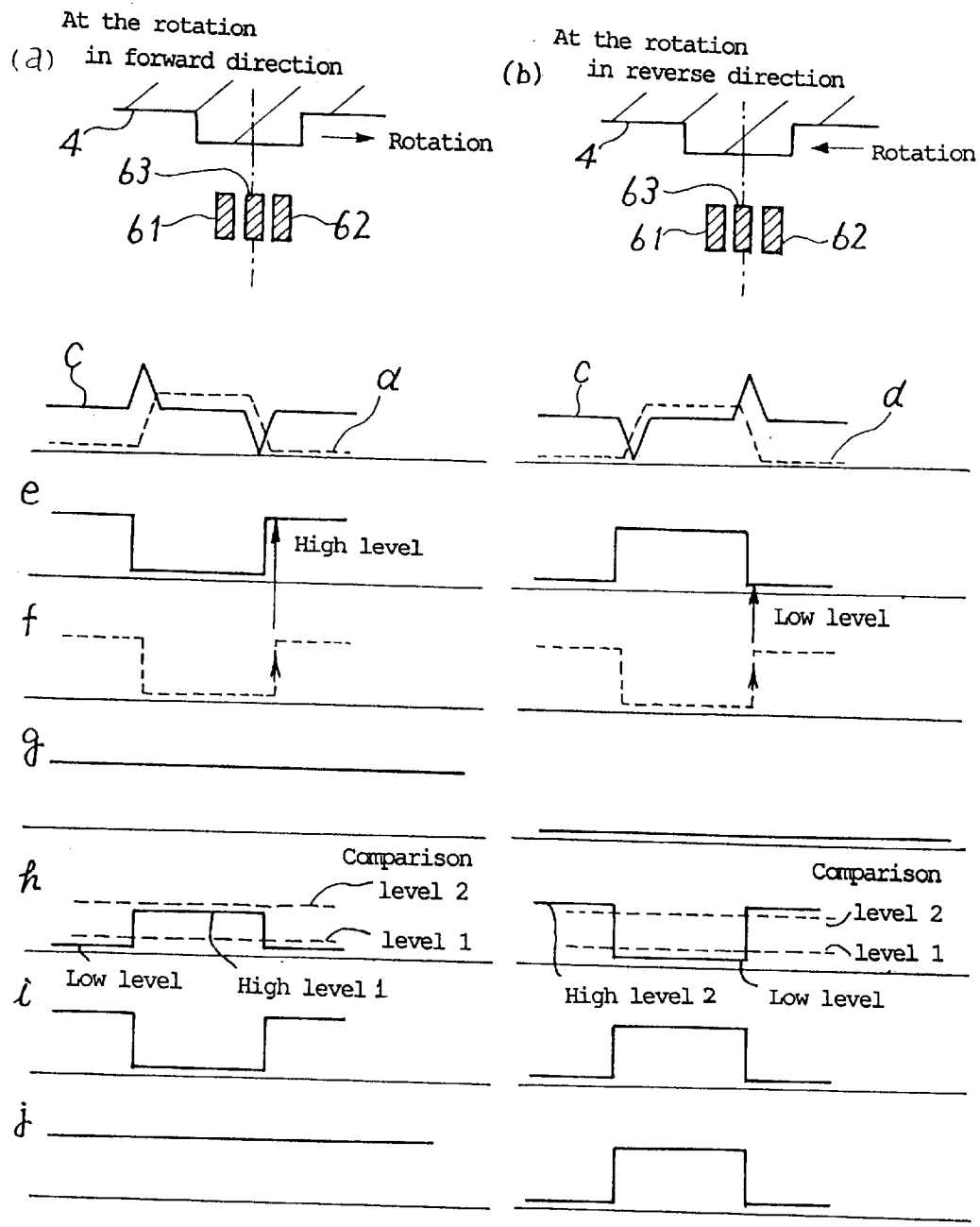
FIG. 13 is a waveform diagram of the electric circuit diagram in FIG. 12.

FIG. 12 is an electric circuit diagram of a magnetic detection device according to Example 5 of the invention. FIG. 13 is a waveform diagram of the electric circuit diagram in FIG. 12. In FIG. 12, arrangement of circuit of the foregoing Example 2 shown in FIG. 5 is partially modified. In the same manner as in the foregoing Example 4, the modified parts are the transistor 40 and the output transistor 37. In the drawings, the same reference numerals as those in FIG. 1 to FIG. 6 and FIGS. 10 and 11 are designated to the same or like parts.

Referring to FIG. 13(a) showing the waveform diagram at the rotation in forward direction, the output g from the D flop-flip 38 is kept at the high level at all times, and therefore the transistor 40 is on. When the output transistor 37 is on, the output h comes to a low level determined on the basis of saturation voltage of the output transistor 37. However, when the output transistor 37 is off, the output h comes to the high level 1.

On the other hand, at the rotation in reverse direction as shown in FIG. 13(b), the output g from the D flip-flop 38 is kept at the low level at all times, and therefore the transistor 40 is off. When the transistor 37 is off, no electric current flows in the transistor 40, and therefore the output h comes to the high level 2 (=VCC).

At this time, three values different depending upon the rotating direction forward or reverse indicate the output h levels. The level is in order of high level 2>high level 1>low level. Such a simple circuit can provide an increased amount of information.

Further, the output h level of output transistor 37 provides binary signal pulses of the high level 1 and the low level at the rotation in forward direction, and provides binary signal pulses of the high level 2 and the low level at the rotation in reverse direction. Therefore, it becomes possible to detect the rotating direction.

In addition, the same operations and advantages as those in the foregoing Example 4 are performed in this Example 5, and further description is omitted herein.

EXAMPLE 6

Figure 14:
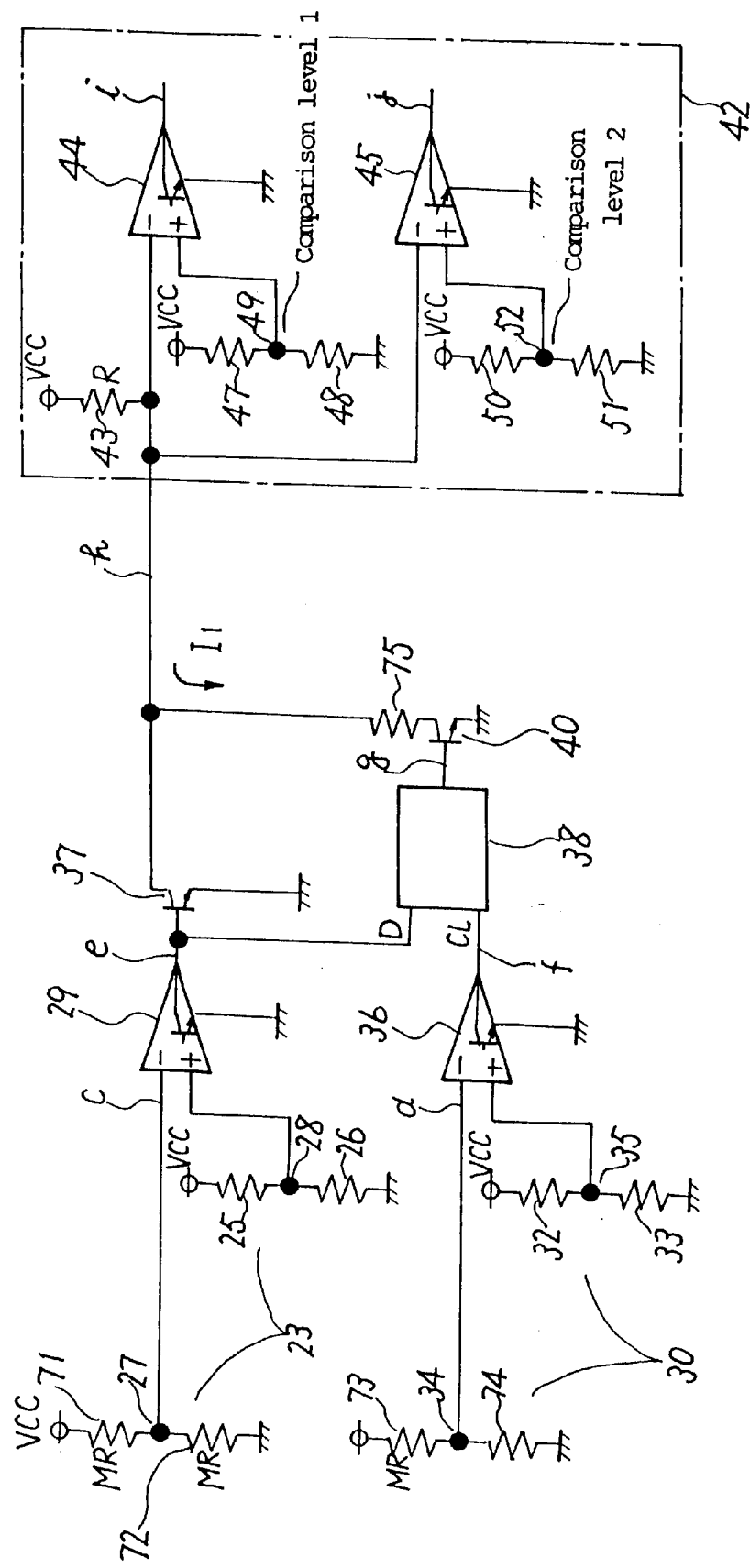
FIG. 14 is an electric circuit diagram of a magnetic detection device according to Example 6 of the invention.

FIG. 14 is an electric circuit diagram of a magnetic detection device according to Example 6 of the invention.

Figure 15:
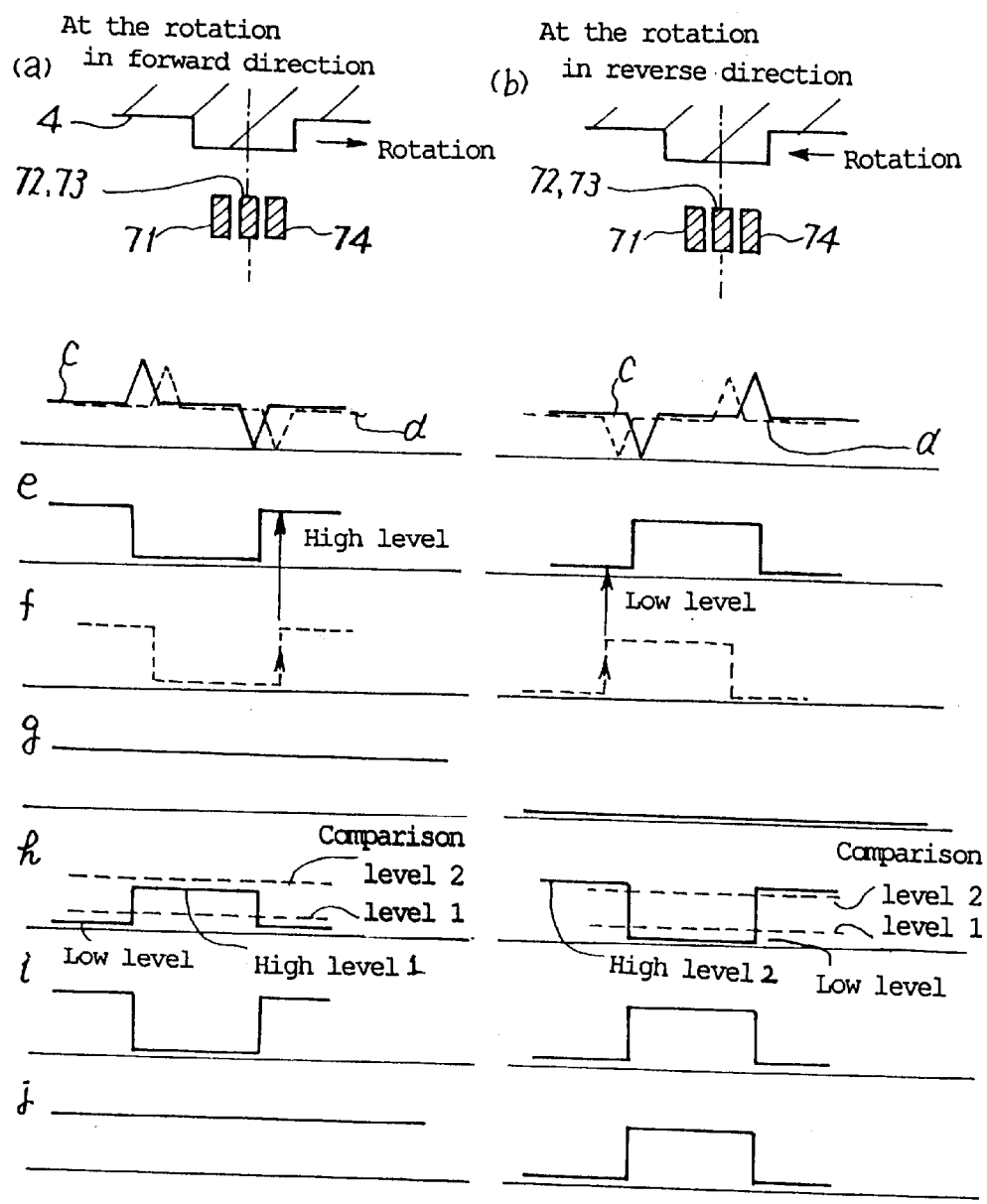
FIG. 15 is a waveform diagram of the electric circuit diagram in FIG. 14.

FIG. 15 is a waveform diagram of the electric circuit diagram in FIG. 14. In FIG. 14, arrangement of circuit of the foregoing Example 3 shown in FIG. 8 is partially modified. In the same manner as in the foregoing Example 4, the modified parts are the transistor 40 and the output transistor 37. In the drawings, the same reference numerals as those in FIG. 1 to FIG. 6 and FIGS. 10 and 11 are designated to the same or like parts.

FIG. 15(a) shows a waveform diagram at the rotation in forward direction, and FIG. 15(b) shows a waveform diagram at the rotation in reverse direction. At this time, three values different depending upon the rotating direction forward or reverse indicate the output h levels. The level is in order of high level 2>high level 1>low level. Such a simple circuit can provide an increased amount of information.

Further, the output h level of output transistor 37 provides a binary signal pulse of the high level 1 and the low level at the rotation in forward direction, and provides a binary signal pulse of the high level 2 and the low level at the rotation in reverse direction. Therefore, it becomes possible to detect the rotating direction using the values of the high levels 1 and 2.

In addition, the same operations and advantages as those in the foregoing Example 4 are performed in this Example 6, and further description is omitted herein.

EXAMPLE 7

Figure 16:
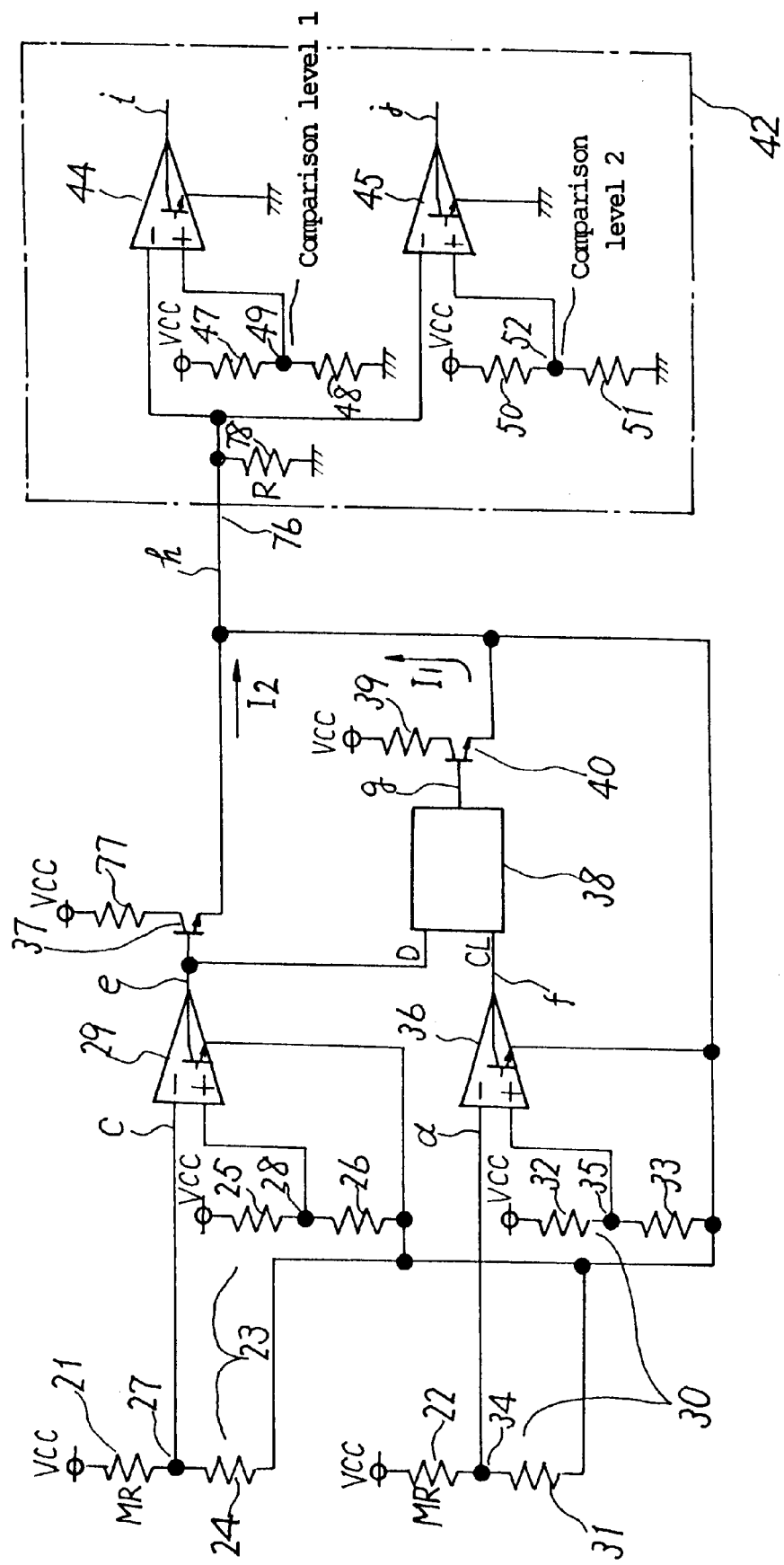
FIG. 16 is an electric circuit diagram of a magnetic detection device according to Example 7 of the invention.
Figure 17:
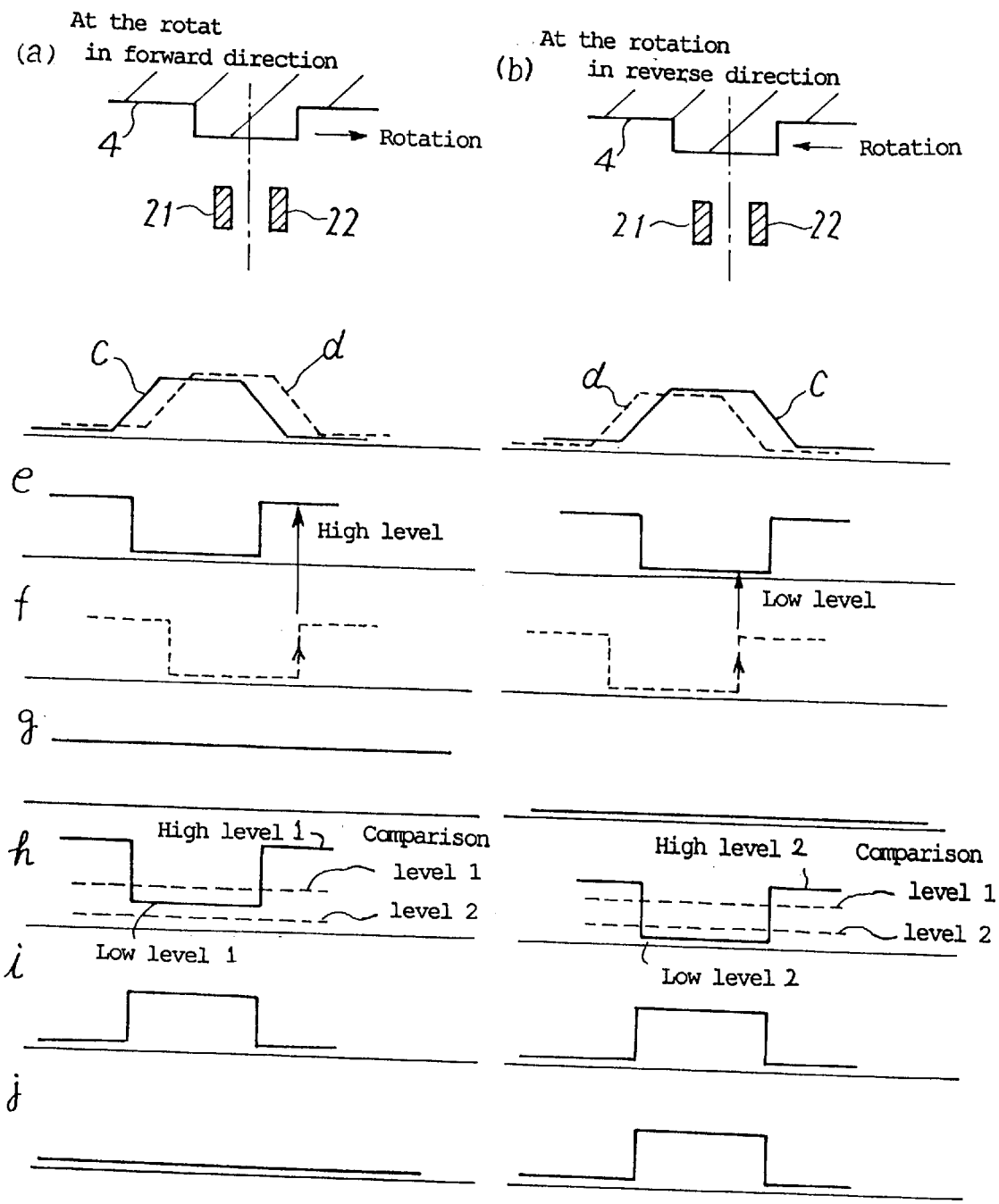
FIG. 17 is a waveform diagram of the electric circuit diagram in FIG. 16.

FIG. 16 is an electric circuit diagram of a magnetic detection device according to Example 7 of the invention. FIG. 17 is a waveform diagram of the electric circuit diagram in FIG. 16. In Example 7, arrangement of circuit of the foregoing Example 1 shown in FIG. 2 is partially modified, and the modified parts will be focused on in the following description. One end of the bridge circuits 23 and 30 is connected to the input terminal 76 of the computer unit 42. A collector of the output transistor 37 is connected to the power supply VCC through the resistor 77. The emitter of the output transistor 37 and the emitter of the transistor 40 are respectively connected to the input terminal 76 of the computer unit 42. Note that a so-called two-wire system is adopted in which all of the electric currents flowing from the power supply VCC through bridge circuits 23 and 33, through the output transistor 37 and through the transistor 40 flow to the input terminal 76 in the computer unit 42. The input terminal 76 of the computer unit 42 is grounded to the earth through the resistor 78 and is further connected to the two comparators 44 and 45. In the drawings, the same reference numerals as those in FIG. 22 to FIG. 24 and FIGS. 1 to 3 are designated to the same or like parts.

Operation is hereinafter described. FIG. 17(a) is a waveform diagram of each part when the toothed magnetic rotor 4 is rotated in forward direction, and FIG. 17(b) is a waveform diagram of each part when the toothed magnetic rotor 4 is rotated in reverse direction. At the rotation in forward direction, the output g from the D flip-flop 38 is kept at the high level at all times, and therefore the transistor 40 is on and supplies an electric current $I_1$ to the resistor 78R disposed in the computer unit 42. On the other hand, at the rotation in reverse direction, the output g from the D flip-flop 38 is at the low level at all times, and therefore the transistor 40 is off, thereby preventing the supply of electric current to the resistor 78R disposed in the computer unit 42.

Furthermore, when the output transistor 37 is off, no electric current is supplied to the resistor 78R disposed in the computer 42 regardless of whether the rotating direction is forward or reverse. However, when the output transistor 37 is on, an electric current $I_2$ is supplied to the resistor 78R disposed in the computer 42 regardless of whether rotating direction is forward or reverse.

As a result, at the rotation in forward direction, the output h of the output transistor 37 (the input voltage h at the input terminal 76 of the computer unit 42) becomes two different values obtained by the following expressions.

High level $1=(I_1+I_2+\text{other circuit current})\times R$ ... (1)

Low level $1=(I_1+\text{other circuit current})\times R$ ... (2)

At the rotation in the reverse direction, the two different values are obtained by the following expressions.

High level $2=(I_1+I_2+\text{other circuit current})\times R$ ... (3)

Low level $2=(\text{Other circuit current})\times R$ (4)

Thus, in this Example 7, the output h level is indicated by the four different values. The level is in order of high level 1>high level 2>low level 1>low level 2. Such a simple circuit can provide an increased amount of information.

As described above, the output g from the D flip-flop 38 comes to the high level (first signal) at the rotation in forward direction and comes to the low level (second signal) at the rotation in reverse direction. Therefore, it becomes possible to detect the rotating direction. Further, the output h level of output transistor 37 provides binary signal pulses of the high level 1 and the low level 1 at the rotation in forward direction, and provides binary signal pulses of the high level 2 and the low level 2 at the rotation in reverse direction. Therefore, it becomes possible to detect the rotating direction using the values of high levels 1, 2 and low levels 1, 2. Further, by applying the output h of the output transistor 37 to the computer unit 42, setting the comparison level 1 of the third comparator 44 in the computer unit 42 to be an intermediate level between the high level 2 and the low level 1, and setting the comparison level 2 of the fourth comparator 45 to be an intermediate level between the low level 1 and the low level 2, it becomes possible to detect the rotating direction. In other words, the situation where no signal is generated at the output j of the fourth comparator 45 indicates the rotation in forward direction, and the situation where a signal is generated indicates the rotation in reverse direction. In addition, a signal is generated at the output i of the third comparator 44 at the rotation in both forward and reverse directions.

Further, as is understood from the waveform diagrams in FIGS. 17(a) and (b), the signal c (pulse) of the bridge circuit 23 on the MR element 21 side corresponding to the position of teeth of the toothed magnetic rotor 4 is synchronized (in opposite phase) with the pulse of the output h of the output transistor 37 regardless of the rotating direction. Therefore, it is possible to recognize the facing condition of the toothed magnetic rotor 4 (whether a protruded portion or a non-protruded portion of the toothed magnetic rotor 4 is facing), which is useful for a control system requiring such a function.

Furthermore, use of a GMR element instead of a MR element can boost the output of the bridge circuit, whereby the detection becomes possible even if there is a large distance between the toothed magnetic rotor 4 and the magnetic detection device, resulting in increase in characteristics of the device. As mentioned above, change rate of the GMR element is approximately 30% as compared with the change rate of 2 to 6% of the MR element. This can boost the output from the bridge circuit to 5 to 15 times as much as that of the MR element.

EXAMPLE 8

Figure 18:
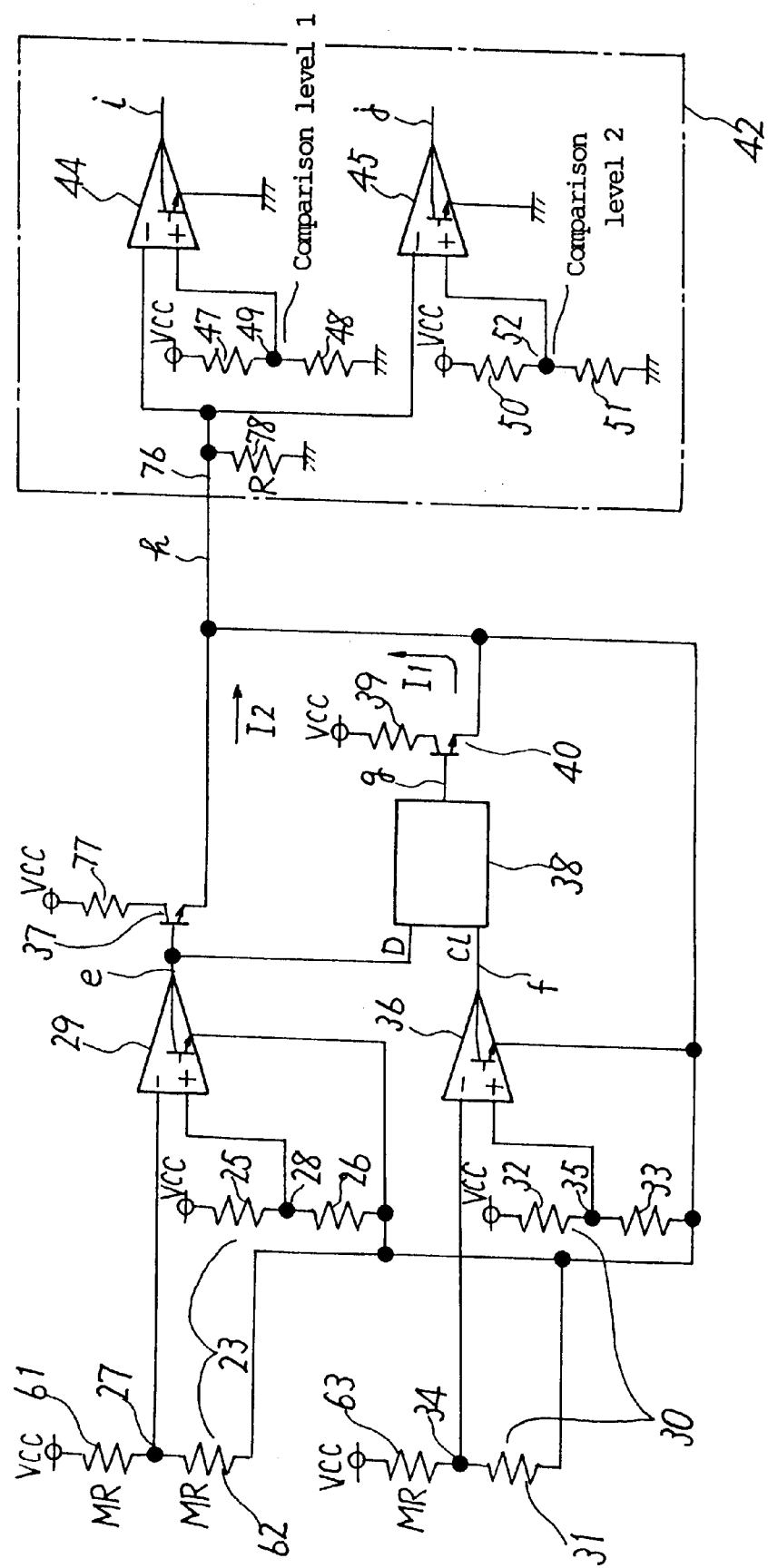
FIG. 18 is an electric circuit diagram of a magnetic detection device according to Example 8 of the invention.
Figure 19:
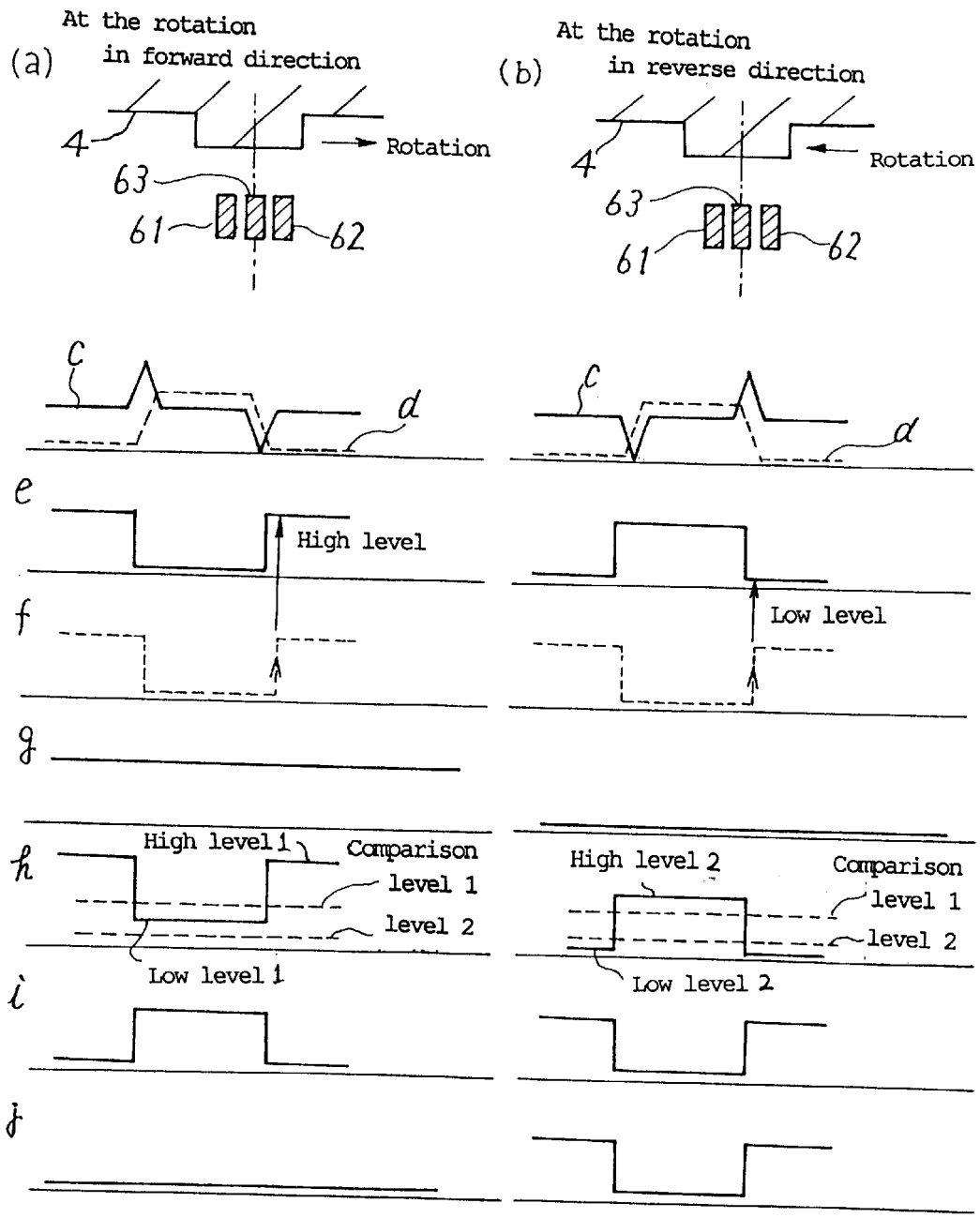
FIG. 19 is a waveform diagram of an electric circuit diagram in FIG. 18.

FIG. 18 is an electric circuit diagram of a magnetic detection device according to Example 8 of the invention. FIG. 19 is a waveform diagram of the electric circuit diagram in FIG. 18. In this Example 8, the bridge circuits 23 and 33 which are connected as shown in FIG. 5 using the MR elements 61, 62 and 63 located in the same manner as in the foregoing FIG. 4 representing the foregoing Example 2 substitutes for the bridge circuits 23 and 30 in the foregoing Example 7. In the drawings, the same reference numerals as those in FIG. 1 to FIG. 6 and FIGS. 16 to 17 are designated to the same or like parts.

Referring to FIG. 19(a) showing the waveform diagram at the rotation in forward direction, the output g from the D flop-flip 38 is kept at the high level at all times, and therefore the transistor 40 is on.

On the other hand, at the rotation in reverse direction as shown in FIG. 19(b), the output g from the D flip-flop 38 is kept at the low level at all times, and therefore the transistor 40 is off. Accordingly, the output h (the input voltage h at the input terminal 76 of the computer unit 42) of the output transistor 37 provides a binary pulse of the high level 1 and the low level 1 at the rotation in forward direction in the same manner as in the foregoing Example 7, and provides a binary pulse of the high level 2 and the low level 2 at the rotation in reverse direction.

Thus, in this Example 8, the output h level is indicated by four different values. The level is in order of high level 1>high level 2>low level 1>low level 2. Such a simple circuit can provide an increased amount of information.

As described above, the output h level of output transistor 37 provides a binary signal pulse of the high level 1 and the low level 1 at the rotation in forward direction, and provides a binary signal pulse of the high level 2 and the low level 2 at the rotation in reverse direction. Therefore, it becomes possible to detect the rotating direction using the values of the high levels 1, 2 and the low levels 1, 2.

In addition, the same operations and advantages as those in the foregoing Example 4 are performed in this Example 7, and further description is omitted herein.

EXAMPLE 9

Figure 20:
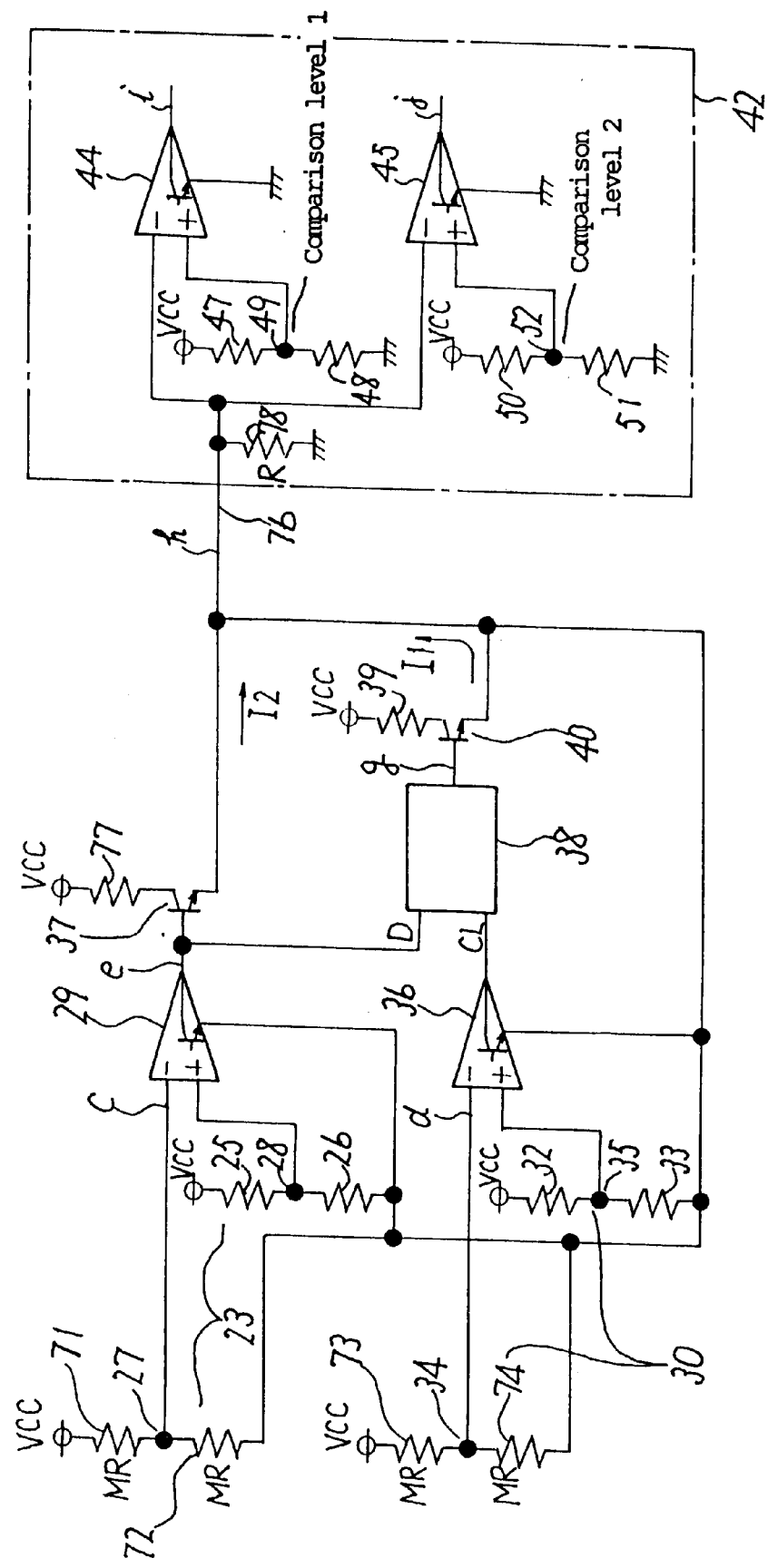
FIG. 20 is an electric circuit diagram of a magnetic detection device according to Example 9 of the invention.
Figure 21:
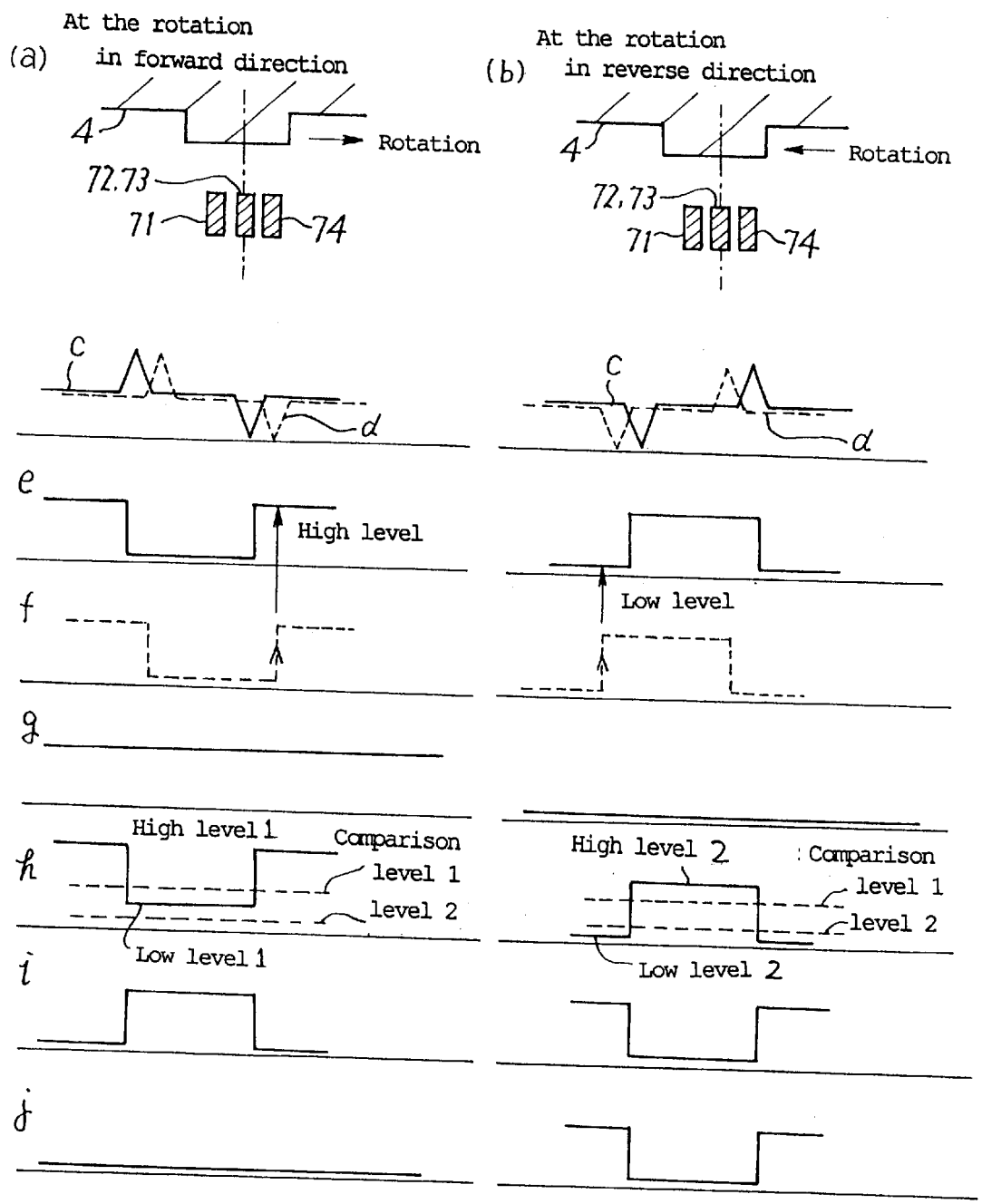
FIG. 21 is a waveform diagram of the electric circuit diagram in FIG. 20.

FIG. 20 is an electric circuit diagram of a magnetic detection device according to Example 9 of the invention. FIG. 21 is a waveform diagram of the electric circuit diagram in FIG. 20. In this Example 9, the bridge circuits 23 and 33 which are connected as shown in FIG. 8 using the MR elements 71, 72, 73 and 74 located in the same manner as in the foregoing FIG. 7 representing the foregoing Example 3 substitutes for the bridge circuits 23 and 30 in the foregoing Example 7. In the drawings, the same reference numerals as those in FIG. 1 to FIG. 9 and FIGS. 16 to 17 are designated to the same or like parts.

Referring to FIG. 21(a) showing the waveform diagram at the rotation in forward direction, the output g from the D flop-flip 38 is kept at the high level at all times, and therefore the transistor 40 is on.

On the other hand, at the rotation in reverse direction as shown in FIG. 21(b), the output g from the D flip-flop 38 is kept at the low level at all times, and therefore the transistor 40 is off. Accordingly, the output h (the input voltage h at the input terminal 76 of the computer unit 42) of the output transistor 37 provides a binary pulse of the high level 1 and the low level 1 at the rotation in forward direction in the same manner as in the foregoing Example 7, and provides a binary pulse of the high level 2 and the low level 2 at the rotation in reverse direction.

Thus, in this Example 9, the output h level is indicated by four different values. The level is in order of high level 1>high level 2>low level 1>low level 2. Such a simple circuit can provide an increased amount of information.

As described above, the output h level of output transistor 37 provides a binary signal pulse of the high level 1 and the low level 1 at the rotation in forward direction, and provides a binary signal pulse of the high level 2 and the low level 2 at the rotation in reverse direction. Therefore, it becomes possible to detect the rotating direction using the values of the high levels 1, 2 and the low levels 1, 2.

In addition, the same operations and advantages as those in the foregoing Example 4 are performed in this Example 7, and further description is omitted herein.

Though each of the foregoing Examples is described on the basis of the toothed magnetic rotor, the invention is applicable not only to rotor but also to longitudinal toothed magnetic movable body provided with concave and convex teeth making it possible to detect moving direction.

What is claimed is:

1. A magnetic detection device comprising:
   a magnet for generating a bias magnetic field;
   first and second magneto-resistance effect element units facing to a toothed magnetic movable body to be detected and located in moving direction thereof within the bias magnetic field of said magnet, and of which resistance changes according to change in condition of the bias magnetic field corresponding to movement of said object to be detected;
   a first resistance change output circuit for outputting change in resistance of said first magneto-resistance effect element units;
   a second resistance change output circuit for outputting change in resistance of said second magneto-resistance effect element units; and
   an output signal processing circuit for outputting a first signal according to phase difference between an output of said first resistance change output circuit and an output of said second resistance change output circuit based on the movement of said object to be detected in forward direction, and for outputting a second signal according to phase difference between outputs of said first and second resistance change output circuits based on the movement of said object to be detected in reverse direction;
   wherein the first magneto-resistance effect element unit is a serially connected unit composed of two magneto-resistance effect elements connected in series, and the second magneto-resistance effect element unit is a serially connected unit composed of two magneto-resistance effect elements connected in series; and
   wherein one magneto-resistance effect element of the first magneto-resistance effect element unit and one magneto-resistance effect element of the second magneto-resistance effect element unit are located in the center, and the other magneto-resistance effect element of the first magneto-resistance effect element unit and the other magneto-resistance effect element of the second magneto-resistance effect element unit are located on two sides sandwiching said magneto-resistance effect elements therebetween, in moving direction of the toothed magnetic movable body.

2. The magnetic detection device according to claim 1, wherein the output signal processing circuit includes a D flip-flop circuit.

3. The magnetic detection device according to claim 2, wherein the output signal processing circuit generates pulses by inputting the output from the first resistance change output circuit to an output transistor and a D terminal of a D flip-flop circuit, inputting the output from the second resistance change output circuit to a CL terminal of said D flip-flop circuit and combining outputs from said D flip-flop circuit and said output transistor.

4. The magnetic detection device according to claim 1, wherein a giant magneto-resistance effect element is used as the magneto-resistance effect element.

5. A magnetic detection device comprising:

a magnet for generating a bias magnetic field;

first and second magneto-resistance effect element units facing to a toothed magnetic movable body to be detected and located in moving direction thereof within the bias magnetic field of said magnet, and of which resistance changes according to change in condition of the bias magnetic field corresponding to movement of said object to be detected;

a first resistance change output circuit for outputting change in resistance of said first magneto-resistance effect element units;

a second resistance change output circuit for outputting change in resistance of said second magneto-resistance effect element units; and an output signal processing circuit for outputting a first signal according to phase difference between an output of said first resistance change output circuit and an output of said second resistance change output circuit based on the movement of said object to be detected in forward direction and generating pulses of high level 1 and low level 1 by said first signal output and the output of said resistance change output circuit, and for outputting a second signal according to phase difference between an output of said first resistance change output circuit and an output of said second resistance change output circuit based on the movement of said object to be detected in reverse direction and generating pulses of high level 2 and low level 2, which are different from either said high level 1 or said low level 1, by said second signal output and the output of said resistance change output circuit.

6. The magnetic detection device according to claim 5, wherein the output signal processing circuit includes a D flip-flop circuit.

7. The magnetic detection device according to claim 6, wherein the output signal processing circuit generates pulses by inputting the output from the first resistance change output circuit to an output transistor and a D terminal of a D flip-flop circuit, inputting the output from the second resistance change output circuit to a CL terminal of said D flip-flop circuit and combining outputs from said D flip-flop circuit and said output transistor.

8. The magnetic detection device according to claim 5, wherein the first magneto-resistance effect element unit is a serially connected unit composed of two magneto-resistance effect elements connected in series, and the second magneto-resistance effect element unit is a serially connected unit composed of two magneto-resistance effect elements connected in series.

9. The magnetic detection device according to claim 8, wherein one magneto-resistance effect element of the first magneto-resistance effect element unit and one magneto-resistance effect element of the second magneto-resistance effect element unit are located in the center, and the other magneto-resistance effect element of the first magneto-resistance effect element unit and the other magneto-resistance effect element of the second magneto-resistance effect element unit are located on two sides sandwiching said magneto-resistance effect elements therebetween, in moving direction of the toothed magnetic movable body.

10. A magnetic detection device comprising:

a magnet for generating a bias magnetic field;

first and second magneto-resistance effect element units facing to a toothed magnetic movable body to be detected and located in moving direction thereof within the bias magnetic field of said magnet, and of which resistance changes according to change in condition of the bias magnetic field corresponding to movement of said object to be detected;

a first resistance change output circuit for outputting change in resistance of said first magneto-resistance effect element units;

a second resistance change output circuit for outputting change in resistance of said second magneto-resistance effect element units; and an output signal processing circuit for outputting a first signal due to said first resistance change output circuit of which output is generated earlier than that of said second resistance change output circuit based on movement of said object to be detected in forward direction and generating pulses of high level 1 and low level 1 by said first signal output and the output of said resistance change output circuit, for outputting a second signal due to said second resistance change output circuit of which output is generated earlier than that of said first resistance change output circuit based on the movement of said object to be detected in reverse direction and generating pulses of high level 2 and low level 2, which are different from either said high level 1 or the mentioned low level 1, by said second signal output and the output of said resistance change output circuit.

11. The magnetic detection device according to claim 10, wherein the output signal processing circuit includes a D flip-flop circuit.

12. The magnetic detection device according to claim 11, wherein the output signal processing circuit generates pulses by inputting the output from the first resistance change output circuit to an output transistor and a D terminal of a D flip-flop circuit, inputting the output from the second resistance change output circuit to a CL terminal of said D flip-flop circuit and combining outputs from said D flip-flop circuit and said output transistor.

13. The magnetic detection device according to claim 10, wherein the first magneto-resistance effect element unit is a serially connected unit composed of two magneto-resistance effect elements connected in series, and the second magneto-resistance effect element unit is a serially connected unit composed of two magneto-resistance effect elements connected in series.

* * * * *